United States Patent
Griffiths

(10) Patent No.: US 6,189,497 B1
(45) Date of Patent: Feb. 20, 2001

(54) VARIABLE VALVE LIFT AND TIMING CAMSHAFT SUPPORT MECHANISM FOR INTERNAL COMBUSTION ENGINES

(76) Inventor: Gary L. Griffiths, 7008 N. Olney St., Indianapolis, IN (US) 46220

( * ) Notice: Under 35 U.S.C. 154(b), the term of this patent shall be extended for 0 days.

(21) Appl. No.: 09/291,241

(22) Filed: Apr. 13, 1999

(51) Int. Cl.[7] .................................................... F01L 13/00
(52) U.S. Cl. .................................. 123/90.15; 123/90.17; 123/90.31
(58) Field of Search .............................. 123/90.15, 90.16, 123/90.17, 90.27, 90.31

(56) References Cited

U.S. PATENT DOCUMENTS

| | | |
|---|---|---|
| 1,305,397 | 6/1919 | Murdock . |
| 2,179,185 | 11/1939 | Jerrell et al. . |
| 2,454,578 | 11/1948 | Smith . |
| 2,958,315 | 11/1960 | Williams . |
| 3,367,312 | 2/1968 | Jonsson . |
| 3,481,314 | 12/1969 | Le Crenn . |
| 3,786,792 | 1/1974 | Pelizzoni . |
| 4,231,330 | 11/1980 | Garcea . |
| 4,258,672 | 3/1981 | Hietikko . |
| 4,378,765 | 4/1983 | Abermeth . |
| 4,438,737 | 3/1984 | Burandt . |
| 4,440,126 | 4/1984 | Abermeth . |
| 4,494,495 | 1/1985 | Nakamura . |
| 4,502,425 | 3/1985 | Wride . |
| 4,627,825 | 12/1986 | Bruss . |
| 4,747,375 | 5/1988 | Williams . |
| 4,787,345 | 11/1988 | Thoma . |
| 4,901,684 | 2/1990 | Wride . |
| 4,986,227 | 1/1991 | Dewey, III . |
| 5,031,584 | 7/1991 | Frost . |
| 5,080,055 | 1/1992 | Komatsu et al. . |
| 5,129,407 | 7/1992 | Phillips . |
| 5,205,247 | 4/1993 | Hoffman . |
| 5,335,636 | 8/1994 | Bilei . |
| 5,353,756 | 10/1994 | Murata . |
| 5,357,915 | 10/1994 | Yamamoto et al. . |
| 5,361,733 | 11/1994 | Spath et al. . |
| 5,404,844 | 4/1995 | Schechter . |
| 5,505,168 | 4/1996 | Nagai . |
| 5,562,072 | 10/1996 | Stoody, Jr. . |
| 5,564,385 | 10/1996 | Hakansson . |
| 5,609,127 | 3/1997 | Noplis . |
| 5,680,841 | 10/1997 | Hu . |

*Primary Examiner*—Weilun Lo
(74) *Attorney, Agent, or Firm*—Woodard, Emhardt, Naughton, Moriarty & McNett

(57) ABSTRACT

A mechanism and method for changing a valve timing and duration of a valve in an internal combustion engine. The mechanism includes a camshaft drive (20), support and housing system (19), and an adjusting mechanism (24–28) which provides for adjusting, according to engine speed, a distance between an axis of the camshaft (17) and the valve train.

11 Claims, 18 Drawing Sheets

INLET AND EXHAUST PERIODS: 230 DEG.
OVERLAP: 15 DEG.

EXHAUST DIAGRAM
  A (BDC) 50% OPEN
  B (75 DEG. AFTER BDC) 100% OPEN
  C (TDC) 5% OPEN

INLET DIAGRAM
  A (TDC) 1% OPEN
  B (110 DEG. AFTER TDC) 100% OPEN
  C (BDC) 50% OPEN

INLET AND EXHAUST PERIODS: 285 DEG.
OVERLAP: 63 DEG.

EXHAUST DIAGRAM
  A (BDC) 65% OPEN
  B (68 DEG. AFTER BDC) 100% OPEN
  C (TDC) 15% OPEN

INLET DIAGRAM
  A (TDC) 12% OPEN
  B (114 DEG. AFTER TDC) 100% OPEN
  C (BDC) 65% OPEN

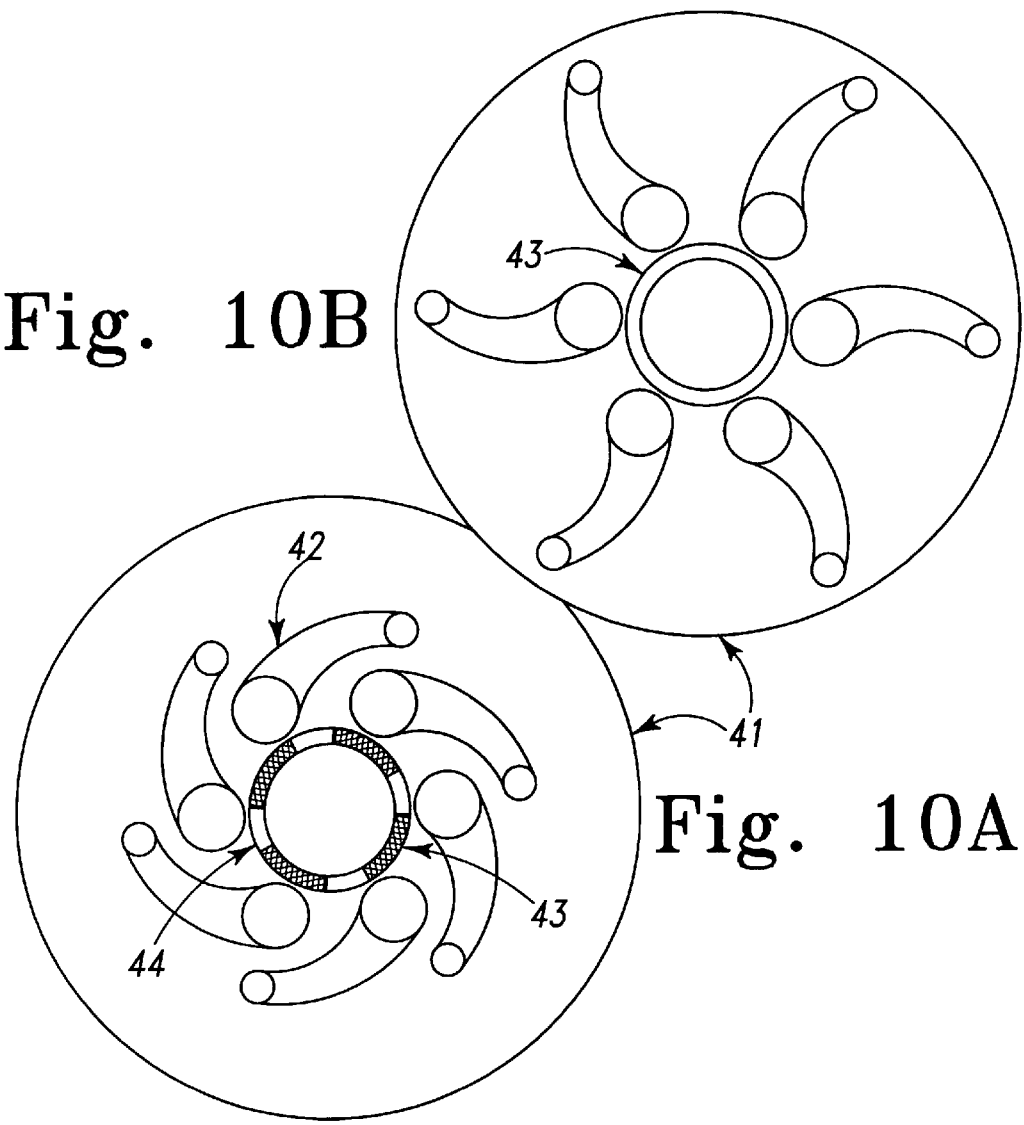
Fig. 10B
Fig. 10A
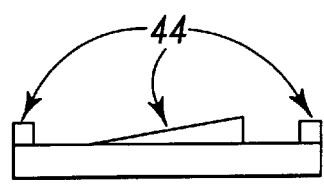
Fig. 10C

VARIABLE VALVE LIFT AND TIMING CAMSHAFT SUPPORT MECHANISM FOR INTERNAL COMBUSTION ENGINES

BACKGROUND OF THE INVENTION

The present invention relates to camshafts, timing gears, lifter bodies and their associated valve train mechanisms for internal combustion engines. The invention concept, incorporated in several alternative designs, is directed at improving overall volumetric efficiency of an internal combustion engine that is operated over a range of engine speeds. More particularly the invention is an improved camshaft drive, support and housing system which provides a method of adjusting, according to engine r.p.m., the distance a valve is raised from its valve seat (lift). Moreover, the invention provides a method of changing the timing and duration of valve opening and closing, relative to crankshaft and piston position, with a change in engine speed.

DESCRIPTION OF THE PRIOR ART

A significant number of prior art inventions have attempted to solve the problem of achieving greater volumetric efficiency of the internal combustion engine by varying the lift and duration of intake and exhaust valves. The replacement of the camshaft with a system of electrically operated solenoids to open engine valves has been explored. Although these systems may allow precise computer driven control of engine valves, drawbacks in reliability stem from the extreme conditions in the operating environment related to heat and vibration. Solenoid operated valve systems also require external power which poses substantial problems in ensuring long term reliability with circuit connections and circuit components when such a system is called upon to operate in a hostile environment of wide temperature variations, incompatible fluids and vibration. Hydraulic methods of using engine lubricating oil to raise valve lifters at high r.p.m. levels have also been proposed and tested. The amount of change in the lift with this method is not substantial and the uniformity of lift can be affected by differences in oil viscosity. Variances in individual lifter performance, due to manufacturing tolerances or differences in oil temperature and supply pressure, also diminish the effectiveness of this method. Other approaches to improve volumetric efficiency with a variable camshaft design have focused only on changing the advance or retardation of a camshaft, with respect to crank rotation, without addressing a change in valve lift or duration of valve opening.

The submitted invention, which uses a mechanical system of valve lift and duration control, has advantages over previously described methods of valve control. High temperatures, inherent in the operation of an internal combustion engine, do not affect the system. Moreover, operation does not depend on an external power source and is not adversely affected by heat or vibration. In addition, it is believed that the system components of the submitted invention can be manufactured at a reasonable cost with respect to the following described benefits.

An understanding of the principles of volumetric efficiency is necessary to appreciate the advantages of the submitted invention.

Volumetric efficiency is the ratio of the actual fuel/air charge taken into the cylinder during the intake phase in relation to the theoretical amount possible for the cylinder. In general, maximum volumetric efficiency is reached at approximately the same r.p.m. level where maximum torque is reached. *Motor Service's Automotive Encyclopedia*, Edited by Toboldt & Johnson, Goodheart-Wilcox Co. 1968. An engine's volumetric efficiency will decrease with operation at a speed where the lift and duration of valve opening restricts the flow of the air/fuel mixture and exhaust gases.

A practical overview of volumetric efficiency and other design considerations is presented in *Scientific Design of Intake and Exhaust Systems*, Philip H Smith, Rev.Ed 1968. It is generally accepted that the optimum opening point for the exhaust valve at high r.p.m. is set at a point of one hundred ten (110) or one hundred twenty (120) degrees of crankshaft rotation on the power stroke. With only a cursory investigation, it would seem that opening the exhaust valve before the piston reaches bottom dead center would deprive the engine of the opportunity to develop maximum power. It has been found, however, that the early opening of the exhaust valve at high r.p.m.'s provides benefits in scavenging the cylinder of exhaust gases. As stated by Smith:

> After the first 110–120 degrees of crank movement from t.d.c. of the power stroke, the working pressure tails off very rapidly; the piston is slowing down and the crank angle (in terms favorable leverage in applying shaft rotation) is becoming progressively less effective. Thus although at first sight shortening the working stroke might seem to be a peculiar method of obtaining more engine power, there is a perfectly logical explanation: it is simply that more is gained from the reduction in exhaust pumping work than is lost by allowing a little of the power impulse to escape.

Page 203.

Smith examines the performance trade-offs of early verses late exhaust valve opening. In acquiring improved elimination of the cylinder at high r.p.m., there is still a loss of pressure through the full power stroke. Moving exhaust gases out of the cylinder requires that the engine must overcome the inertia of the exhaust gas and the tendency of those gases to resist movement. For an engine operating at low r.p.m., more time is available on each exhaust stroke to accomplish the task of exhaust scavenging. At lower r.p.m levels the opening of the exhaust valve can be delayed for additional degrees of crankshaft rotation to be at or near the point that the piston reaches bottom dead center. In this respect, the diminishing force available from the engine's power stroke can be more fully utilized and the task of scavenging the engine can still be accomplished effectively.

The timing for opening the intake valve can also be optimized for a given r.p.m. level in an engine. At high engine speeds the opening of the intake valve before top dead center in the exhaust stroke will assist in filling the cylinder with a fresh air/fuel charge. Again the element of time available for the engine to overcome the effects of inertia on the column of intake air is a factor in choosing the point at which the intake valve is to open.

The point of crankshaft rotation at which the intake valve is to close is also a factor in engine design. Again a compromise is made, relating to the particular point at which the intake valve will close after the piston begins its upward motion to start the compression stroke. As stated by Smith:

> This is, of course, made possible by the general refusal of the gas flowing into the cylinder, to reverse its direction simultaneously with the piston reversal at b.d.c. It continues its direction of flow in defiance of the contrarily rising piston, but obviously, if valve closure is delayed too long, the flow will be reversed and the gas pushed back into the induction manifold. . . . The drawback is that with a continually varying throttle opening, as necessitated in normal driving, the inertia of the gas cannot remain constant and thus the tendency or otherwise for reverse flow to occur is dependant on the gas-flow speed, which again depends on throttle opening and engine revolutions. If the closing is delayed for the sake of good power at high rev/min, slow running may be poor because of the uneven distribution set up in the manifold by pressure surges. . . . It has often been found that valve timings aimed at maximum power at peak rev/min undesirably reduce the lower-speed torque.

Page 204.

Two diagrams, from Smith's book, show the effect of different cam lobe profiles and are presented for review as FIGS. 1 & 2. FIG. 1 shows the resulting crankshaft rotation points of opening and closing of intake and exhaust valves with a cam that is made with a relatively short duration. FIG. 2 shows the expanded duration of intake and exhaust valve opening for a cam which is ground with a relatively long duration. It would therefore be advantageous, from a volumetric efficiency viewpoint, to have the ability to design an engine that would automatically adjust its points of valve opening and closing as the engine is operated over a range of r.p.m.

In a conventional internal combustion engine the camshaft is housed in the engine block and its shaft position is fixed relative to the crankshaft and the valves within the cylinder head. The camshaft is connected to the crankshaft by timing gears or a timing chain. In a four (4) cycle engine the camshaft rotates one (1) revolution for every two (2) crankshaft revolutions. As previously detailed, the point at which the valves open is of significant importance. The amount of lift on the valve also presents a problem in terms of design compromises. At high engine speeds it is apparent that high valve lift will aid cylinder filling and discharge by minimizing the valves' restriction to the flow of both the incoming fuel/air mixture and the spent exhaust gases. At low engine speeds, a smaller intake valve lift serves to promote turbulence of the incoming air/fuel mixture as it flows through a more restricted valve opening. The additional turbulence assists in preserving the suspension of fuel droplets in the incoming air and thereby maintains the proper air/fuel mixture. Moreover, maximum valve lift is also undesirable at low r.p.m. due to the use of engine power that is wasted in forcing open the valve train assembly to a lift position that is only necessary for high speed operation.

Conventional camshaft lobe design requires design tradeoffs and compromises. By choosing a specific valve lift and specific valve duration that yields maximum torque at one specific r.p.m. level, only acceptable, not optimum, performance is achieved over the remaining range of expected engine speeds.

A mechanically reliable method of dynamically changing the amount of valve lift and the duration of valve lift would be a substantial improvement over the prior art. Such an improvement will serve to increase volumetric efficiency, increase the power output of an engine over a wider range of r.p.m., allow the engine to idle at a lower speed, reduce fuel consumption and generally reduce exhaust emissions.

SUMMARY OF THE INVENTION

The invention allows rotating camshaft lobes to change their effective lift on intake and exhaust valves by moving the camshaft axis toward or away from the valve lifter assemblies as a function of engine speed. At high engine speeds, the axis of the cam is positioned so that the full height of the cam lobe will cause the valve to achieve maximum lift and maximum opening duration.

As engine speed is reduced, the camshaft axis is moved away from the lifter assemblies, the rising camshaft lobe must first make up the distance that the camshaft axis has been moved before the valve opens. Therefore, the effective lift on the valve is reduced and the duration envelope, the rotational distance of the crankshaft between valve opening and closing, is also decreased.

Moreover, in some of the submitted designs, which incorporate separate exhaust and intake camshafts, the point of maximum valve opening is advanced or retarded with changes in engine speed. The benefits of the system will be seen by those knowledgeable in the art as a reliable and effective method of controlling valve timing and valve lift to promote the flow of intake and exhaust gases through the combustion chamber with changes in engine speed.

The invention also provides a mechanical method of moving a camshaft toward or away from lifter assembly bodies in the valve train in relation to high or low engine speed. The method of achieving this set of operations over a range of engine speeds is set forth in detail in the following sections. In summary the invention offers improvements over a conventional engine equipped with a camshaft of fixed lift and duration by:

1. Dynamically changing the opening and closing points of intake and exhaust valves at optimum points of crankshaft rotation for a particular engine speed.
2. Dynamically changing the amount of intake and exhaust valve lift relative to engine speed.
3. Advancing or retarding the duration period of valve opening as the camshaft's angular position changes as a result of the motion around the camshaft drive gear to increase or decrease the amount of effective lift on the valves.

The benefits derived from a system which allows for varying the effective lift and valve opening duration are:

1. Improving volumetric efficiency of an internal combustion engine over a wider r.p.m. range of operation.
2. Reducing internal friction and rotational resistance at lower r.p.m.'s due by opening the valves only to the extent necessary to achieve adequate filling and discharge of the cylinder.
3. Allowing the development of engines for which maximum torque does not decrease, or does not substantially decrease, as engine r.p.m. is increased past the typical mid-range speed of maximum torque.
4. Conservation of fuel and reduction of exhaust emissions due to lower achievable idle speeds and improved engine efficiency.

BRIEF DESCRIPTION OF THE DRAWINGS

FIGS. 10 A–C illustrate a flywheel having movable centrifugal weights, for use with the second embodiment of FIG. 9.

DESCRIPTION OF THE PREFERRED EMBODIMENTS

Figure 1:
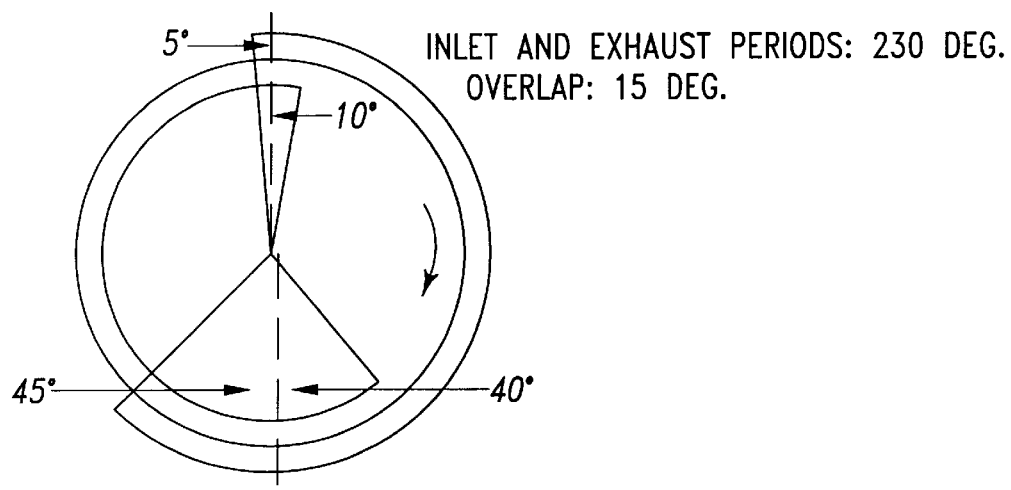
FIG. 1 is a schematic diagram illustrating valve timing with small overlap and moderate opening periods.
Figure 1:
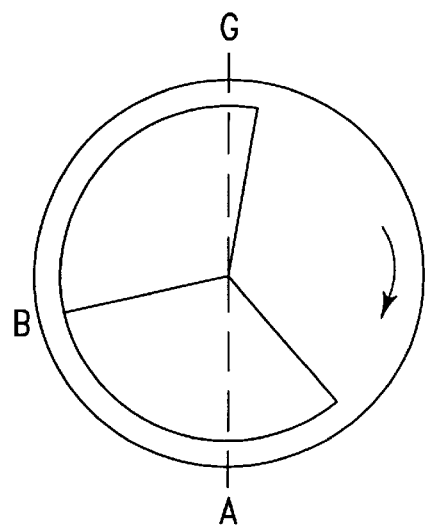
Figure 1:
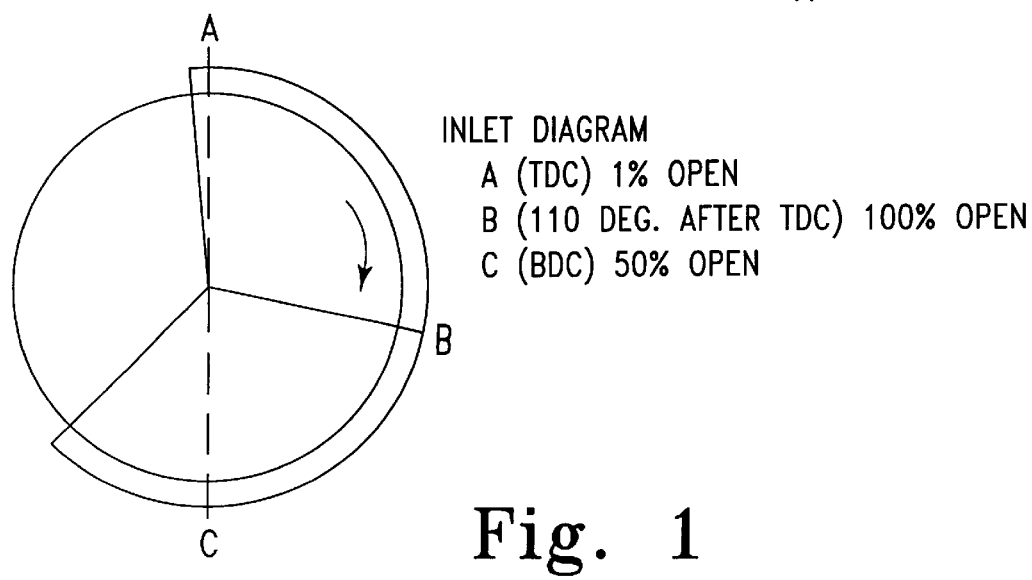

For the purpose of promoting an understanding of the principles of the invention, reference will now be made to the embodiment illustrated in the drawings and specific language will be used to describe the same. It will nevertheless be understood that no limitation of the scope of the invention is thereby intended. Such alterations and further modifications in the illustrated device, and such further applications of the principles of the invention as illustrated therein, being contemplated as would normally occur to one skilled in the art to which the invention relates.

The submitted invention, the Variable Lift Camshaft (V.L.C.) is based on an internal combustion engine block and is described herein with reference to a V-8 engine block, although the present invention may be utilized with engines having any number of cylinders. The invention provides a method of changing the lift and duration of exhaust and intake valve opening as a function of engine revolutions per minute. The system, and its alternatives, will henceforth be referred to as a Variable Lift Camshaft (V.L.C). Three versions of the V.L.C. are presented; two that reside in the lifter valley of a V-8 block that employs push rods to actuate overhead valves in the cylinder head, and a third method where the camshafts are positioned directly over the cylinder head valves. These three designs which are described in the following text as the Alpha, Theta and Delta designs. A fourth design, the Omega, shows an alternative method of operating and positioning the V.L.C. and its features can be incorporated into the other three designs.

ALPHA DESIGN

Figure 3:
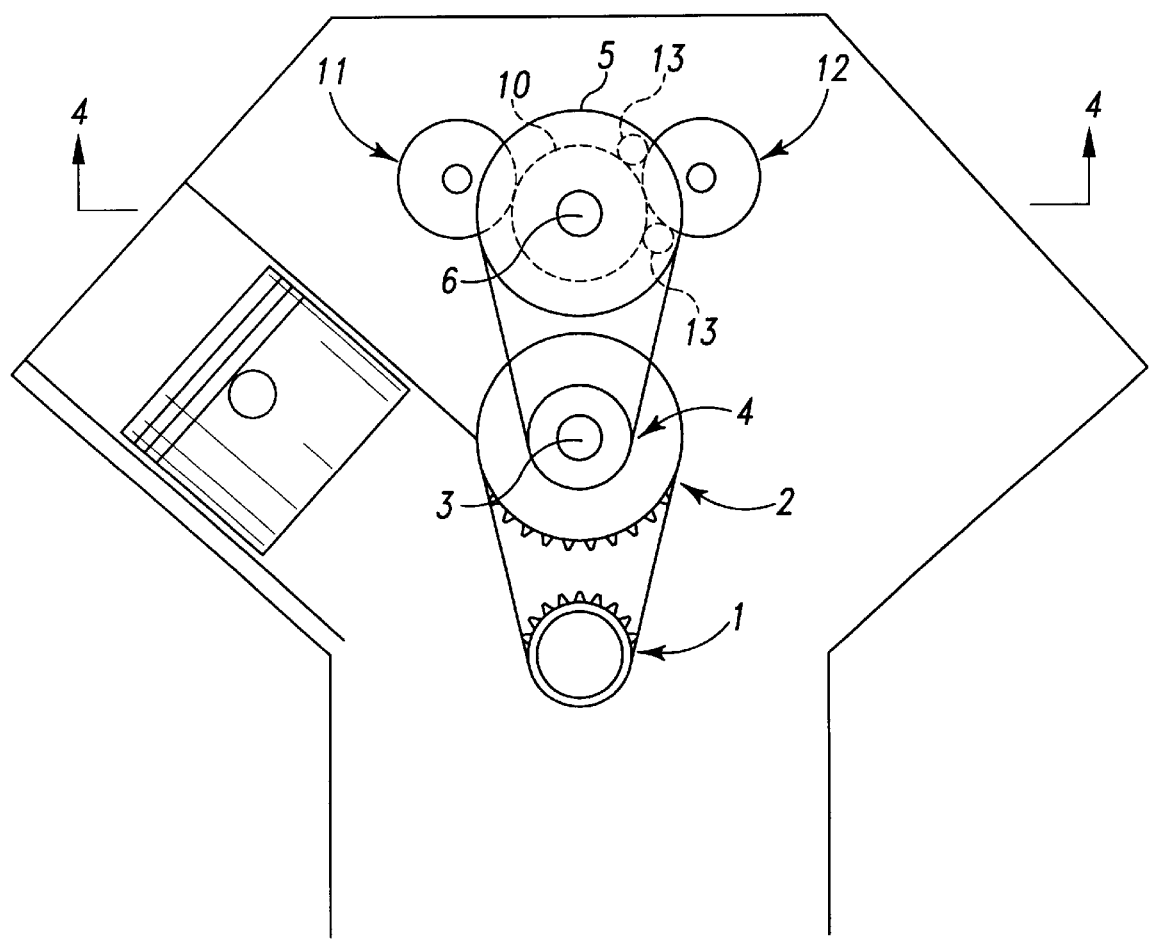
FIG. 3 is a front elevational view of an engine incorporating a first embodiment of the present invention.

FIG. 3 shows the crankshaft sprocket gear 1 and its timing gear mate 2 are positioned as normally found in a V-8 engine. Timing gear 2 is twice the diameter of the crankshaft sprocket gear 1, thereby causing timing gear 2 to rotate at one-half (½) the speed of crankshaft sprocket gear 1. The camshaft, usually located above the crankshaft in a V-8 engine, is replaced by a shaft 3 that serves as a base of support for speed reduction gears. If desired, two functions of a traditional camshaft can be retained on this replacement; the use of a cam lobe to activate a fuel pump and a gear to drive a distributor ignition system and the oil pump. For purposes of clarity, the shaft 3 that resides in the traditional camshaft location will be referred to as the drive shaft and can be employed as the name would suggest.

A second drive shaft gear 4, is located in front of timing gear 2 on drive shaft 3. Gear 4 mates, in a similar two-to-one reduction, with another timing gear 5 which is twice the diameter of gear 4 and which rotates on shaft 6.

Figure 4:
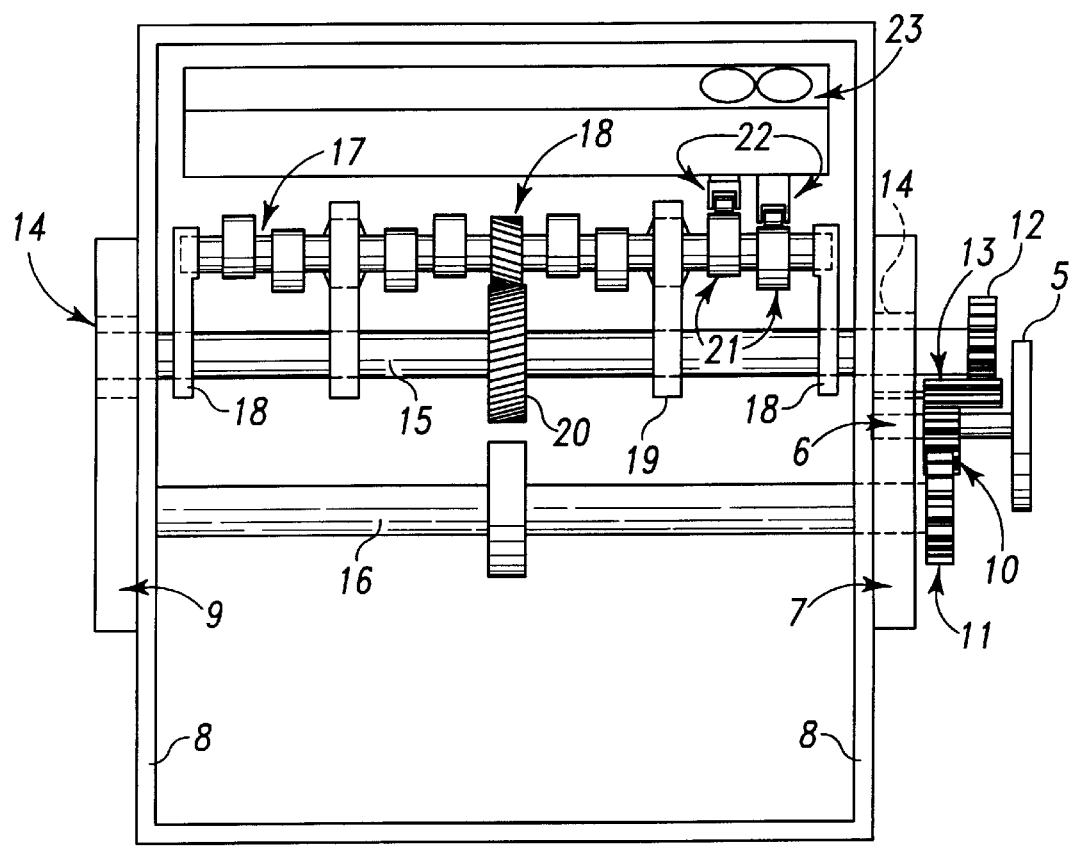
FIG. 4 is a side cross-sectional view of the engine invention of FIG. 3.

The right side of FIG. 4 shows that shaft 6 is a short center fixed shaft mounted on a support plate 7 which are attached to the existing webs 8 of the engine block. In a similar manner another support plate 9 is mounted on the other end of the engine block.

Located on the transfer shaft 6, and affixed to the timing gear 5 is a base gear 10 of a diameter slightly smaller than timing gear 5. Referring back to FIG. 3, it can be seen that this base gear 10 drives two similarly sized "Y" gears, 11 & 12, located to either side of base gear 10. Viewing the base gear 10 and the two "Y" gears 11 & 12 from the front shows the "Y" form of this gear arrangement. One of the "Y" gears is directly driven by the base gear and the other "Y" gear is driven by two small idler gears 13 located between the base gear and this second "Y" gear. FIG. 4 shows that the idler gears engage the base gear 10 and the "Y" gear 12 at different points along the length of the idler gears to prevent interference between the teeth of base gear 10 and the "Y" gear. This arrangement allows the two "Y" gears to rotate in opposite directions and thereby maintain symmetry in the operation of both cams and their respective lifter assemblies which will be discussed in following paragraphs.

Referring again to FIG. 4, each "Y" gear 11 and 12 are fixed to separate "Y" shafts, 15 & 16. Bearings 14 are located in support plates 7 and 9 to engage the "Y" shafts. These "Y" shafts run parallel to the each other though the existing camshaft/lifter valley in a standard V-8 block. With the use of two timing gear sets, connecting first the crankshaft to the drive shaft, with gears 1 and 2, and then connecting drive shaft 3 to the gears 5 and 10 on the fixed shaft 6, the "Y" gears 11 and 12 and the "Y" shafts 15 and 16, now turn at one-forth (¼) the speed of the crankshaft.

This version of the submitted invention uses two camshafts. Only one camshaft 17 is illustrated in FIG. 4 the second would be a mirror image of the assembly illustrated with components 17 through 22. Each camshaft is ground with eight (8) lobes having a profile that provides the highest lift and longest duration that would maximize performance at the highest speed the engine is expected to achieve. Without the usual requirement of a cam lobe for the fuel pump distributor drive gear, each camshaft can be made shorter in length than the distance between the two end webs 8 in the camshaft valley. In this manner, the camshaft 17 aligns its lobes with the modified and pre-existing valve train mechanism. Conventional push rods are sufficiently reduced in length for operation along the cam/lifter valley of the existing engine block.

Figure 5:
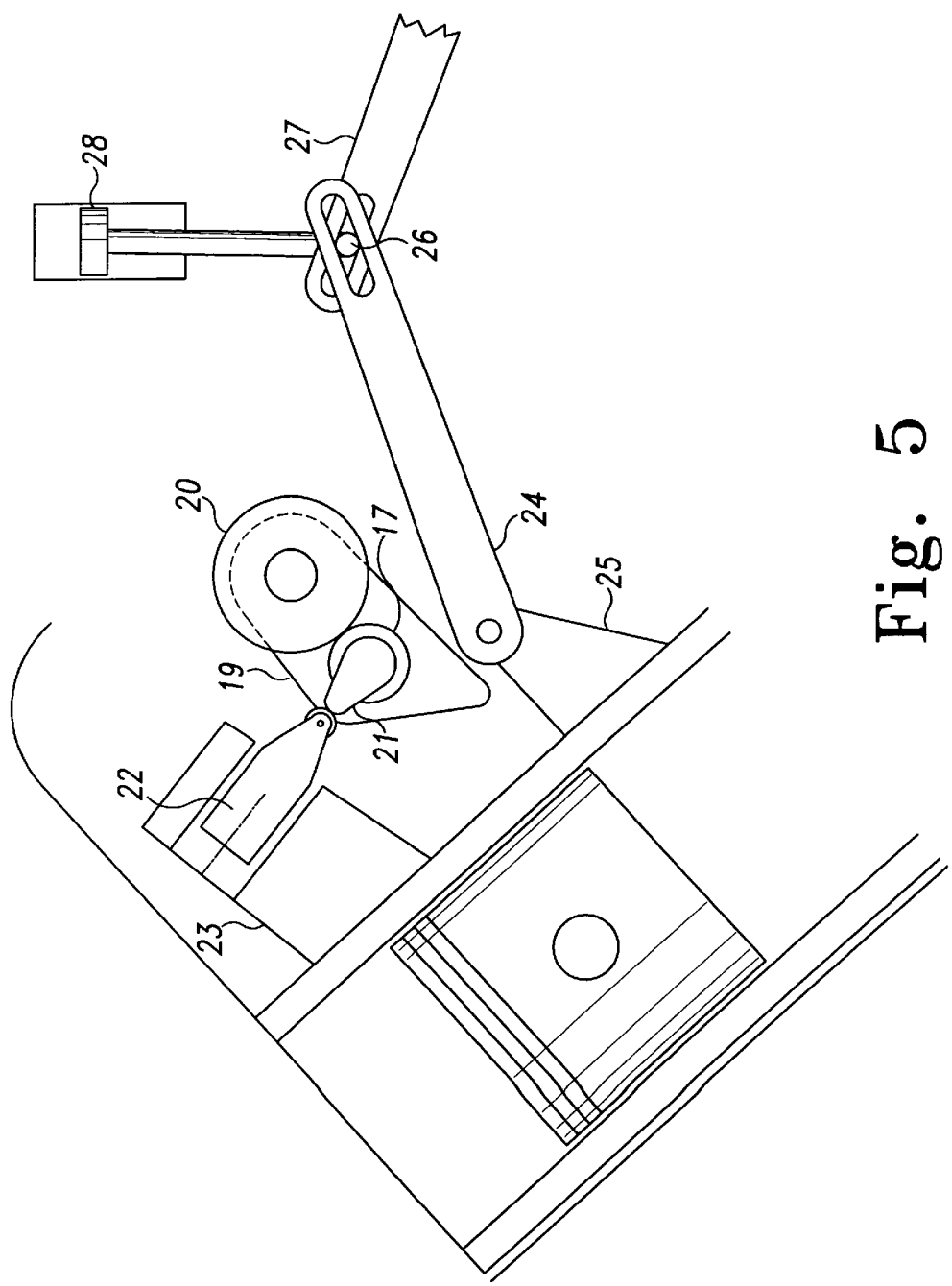
FIG. 5 is a partial cross-sectional front view of the engine invention of FIG. 3, showing a camshaft movement mechanism of the present invention.

A typical V-8 camshaft has five bearing surfaces; two at each end of the camshaft and three bearings which separate sixteen (16) cam lobes in sets of four. FIGS. 4 and 5 show that each camshaft is supported by a series of four (4) suspension brackets 18 & 19. In the submitted invention the ends of camshaft 17 are fitted into bearing pockets on the outer suspension brackets 18. Two inner suspension brackets 19 are located approximately equidistant between the ends of the "Y" shaft and the drive gear 20 mounted on the "Y" shaft.

FIG. 4 also shows that the drive gear 20, twice the diameter of the cam gear 18, is located at the midpoint of "Y" shaft 15 to engage cam gear 18. Because the "Y" gears are turning the "Y" shafts and the drive gear(s) 20 at one-forth the crankshaft speed, and the camshaft gear 18 is one-half the diameter of the drive gear 20, camshaft 17 will then turn at the normal one-half (½) the crankshaft speed. FIG. 4 also shows that each camshaft lobe 21 engages an outer lifter 22 within a lifter bank 23.

FIG. 5 shows a side view of the suspension brackets 19 which support camshaft 17. The side view of FIG. 5 also shows that the lifter assembly 22, in the lifter block 23, is positioned near the rotating lobe 21 of camshaft 17. Short push rods, not shown, would be used to complete the valve train to the rocker arms and valves in the cylinder heads of the engine. It can be seen that the suspension bracket 19 positions the camshaft 17 to hang from "Y" shaft 15. The distance between the centers of camshaft 17 and "Y" shaft 15 are the sum of the radius of the cam gear 18 plus the radius of the drive gear 19.

Referring to FIG. 5, the suspension brackets 19 contact a lever cam 24 which pivots on a mounting 25 that is attached to the lifter valley surface of the V-8 block. A small offset of the pivot post hole in the lever cam, with respect to the radius distance from the center of this hole to the arc of the outside surface of the lever end, creates a cam which possesses a substantial mechanical advantage. Lever cam 24 is also mated, via pin 26, with a second lever cam 27 that serves the opposite bank of cylinders.

A force exerted on piston 28 moves the mating pin 26 up or down and causes the interconnected lever cams 24 and 27 to rotate an equal number of degrees. This motion of piston 30 results in forcing the lever cams to rotate and push the suspension bracket and the rotating camshaft closer or further away from the bank of lifter assemblies. Vibration dampeners, not shown, may be attached to the suspension brackets at various points to assist smooth operation of the engine.

The motion on the piston 28 can be achieved in a variety of methods and could be manually activated or automatically tied to engine r.p.m. levels. Hydraulic pressure, from a dedicated and controllable pump, can be employed to drive the piston 28 and in turn move the camshaft 17 closer or further from the lifter assemblies 22. An electronic method, using stepper motors, a gear train and control circuitry, could also be designed to receive inputs on engine r.p.m., activate the stepper motor and gear train to produce a linear motion to operate the lever cams.

The use of opposing springs on the lever cam, not shown, could also be employed to create a default position, to counteract the potential adverse effects of failure of the drive for the cam lever. Other means for controlling this motion will be apparent to those having ordinary skill in the art.

Figure 6:
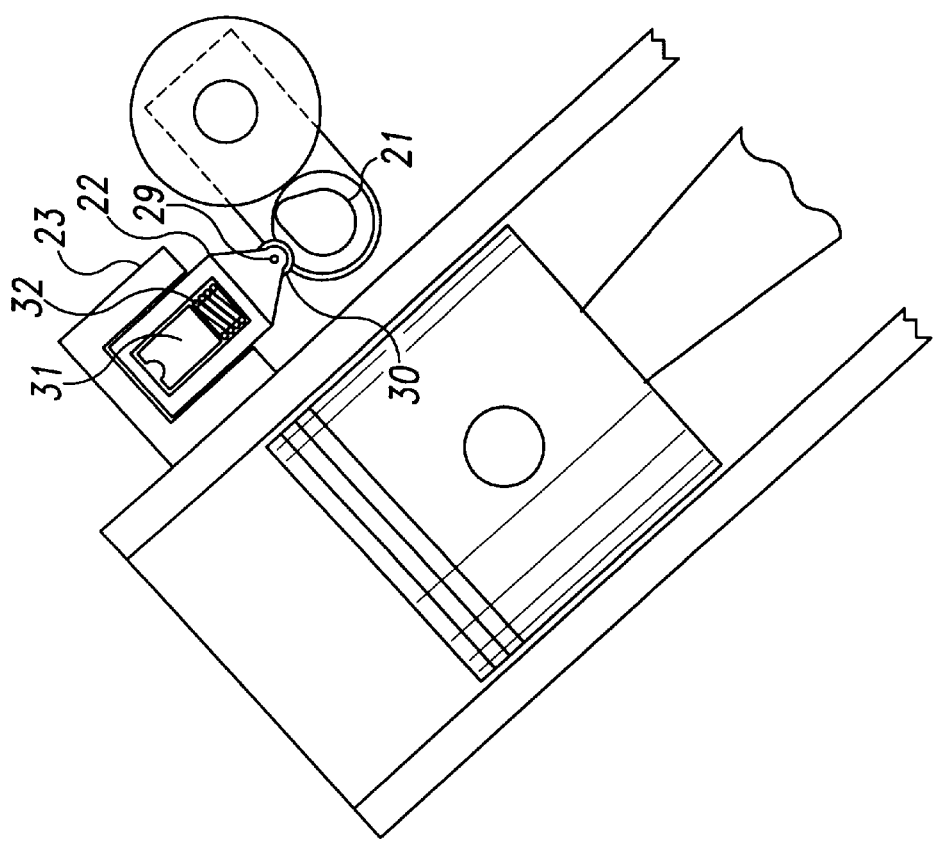
FIG. 6 is a partial cross-sectional front view of the engine of FIG. 3, showing a valve lifter arrangement of the present invention.

A replacement lifter arrangement is employed with the submitted invention. FIG. 6 shows a side view of one of two lifter housing blocks 23 to receive the following described lifter assemblies 22. The lifters are arranged in a line corresponding to each bank of cylinder's designated valve and rocker arms and the camshaft lobes. The lifter housing blocks are secured at or near the top of each side of the V-8 block valley. With the installation of the following described lifters, short push rods, not shown, are then used to complete the valve train connection in the traditional manner.

The lifters in the submitted invention are constructed similar to roller lifters which are widely used in racing applications. Referring to FIG. 6, the outer lifter body 22 consists of a cylinder with a closed end, outer attachment brackets and axle 29 for cam roller 30 which comes into contact with the camshaft lobe. A roller lifter, in its traditional use, rides on the cam lobe and cam heel throughout the 360 degrees of rotation. Due to the desired objective of varying the effect of the cam lobe lift and duration, a telescoping lifter assembly is used which consists of an inner lifter 31, an outer lifter 22 and a compression spring 32.

The compression spring 32, considerably weaker in terms of compression resistance than the valve spring(s), is placed between the inner and outer lifter cylinders. For low r.p.m. engine settings with the camshaft positioned away from the lifter assembly, the compression spring 32 between the two lifter bodies forces the roller 30 to maintain contact with the cam lobe 21. As the rise of the rotating cam lobe 21 begins to push the outer lifter toward the solid inner lifter, the valve remains closed. With further rotation of the cam lobe, the compression spring compresses completely and the lifter assembly "bottoms out." At this point, further rotation of the cam lobe results in moving the inner lifter toward the cylinder head and the intake or exhaust valve begins to open.

Figure 7:
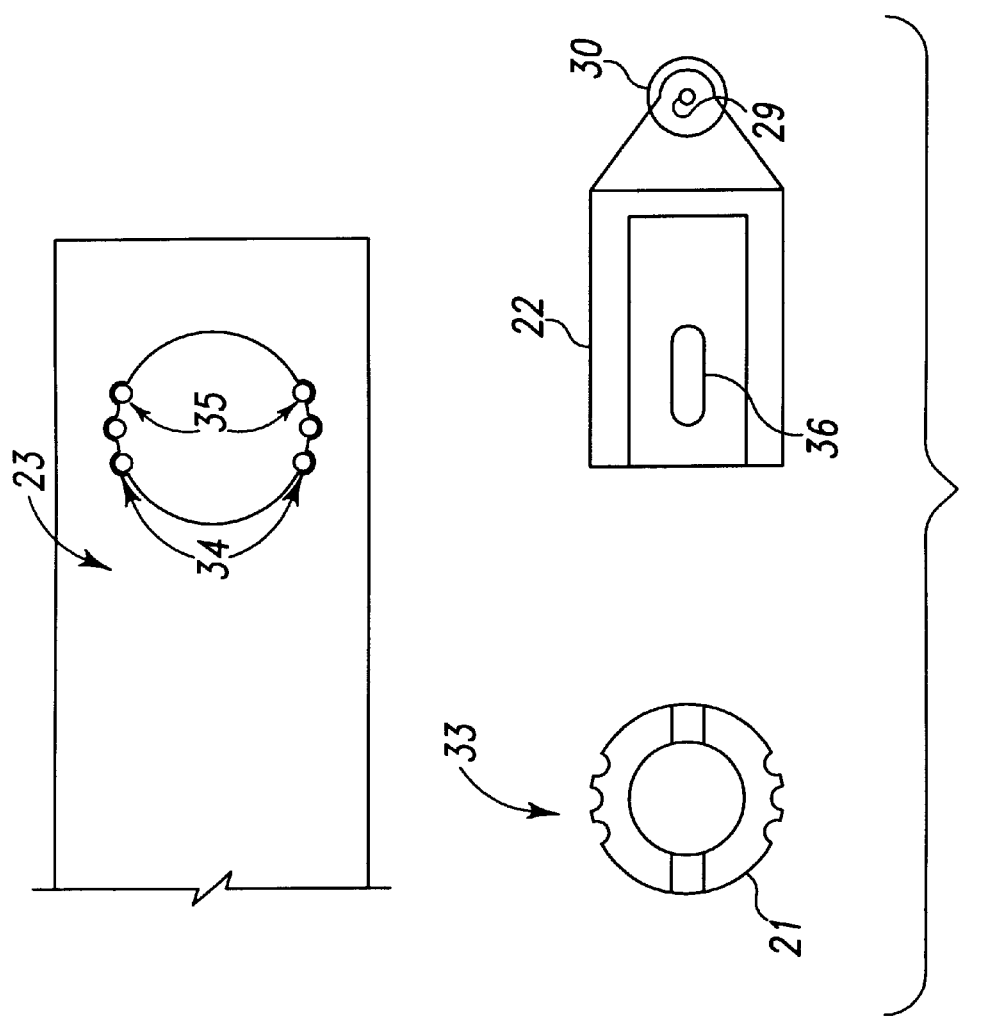
FIG. 7 is a detail view of the lifter and lifter block components which are also shown in FIG. 5.

Referring to FIG. 7, the outer lifter body contains a series of semi-circular channels 33 parallel to the centerline of the outer lifter cylinder. The channels are aligned with corresponding channels 34 in the lifter housing 23. Ball bearings 35, slightly smaller in diameter than the tunnel formed by the channels 35 of the outer lifter and the channel in the lifter block, are placed in a linear arrangement to prevent rotation of the outer lifter cylinder. This prevents misalignment of the outer lifter roller with the cam lobes. A slot 36 through the side of the outer lifter body allows the flow of lubricating oil from an oil galley within the lifter housing to lubricate the solid inner lifter.

It can be seen by those skilled in the art that additional hardware can also be employed to stabilize the suspension bracket/cam assembly. The existing, and unused lifter cylinders in the V-8 block, could be fitted with pistons which remain stationary and serve as a support for the horizontal motion of the suspension brackets and the camshafts. With the closing of the lifter pocket end adjacent to the traditional camshaft, these pistons could be hydraulically activated to pump the cam and suspension bracket assembly closer to the lifter housing. Pistons within the existing lifter cylinders could also be used to assure uniform camshaft motion toward and away from the lifter assembly. The Omega design, as described in following paragraphs, details another method of operating the suspension brackets.

OMEGA DESIGN

The following variation of the V.L.C is an alternative method of operating the suspension brackets to move the camshaft toward and away from the lifter assemblies. As an alternative to cam levers 24 and 27, this design uses the existing camshaft bore and the existing lifter pockets in the V-8 block along with additional hardware. The Omega design offers advantages in providing a more precise method of positioning the camshaft suspension brackets and is less susceptible to failure caused by engine vibration.

Figure 8:
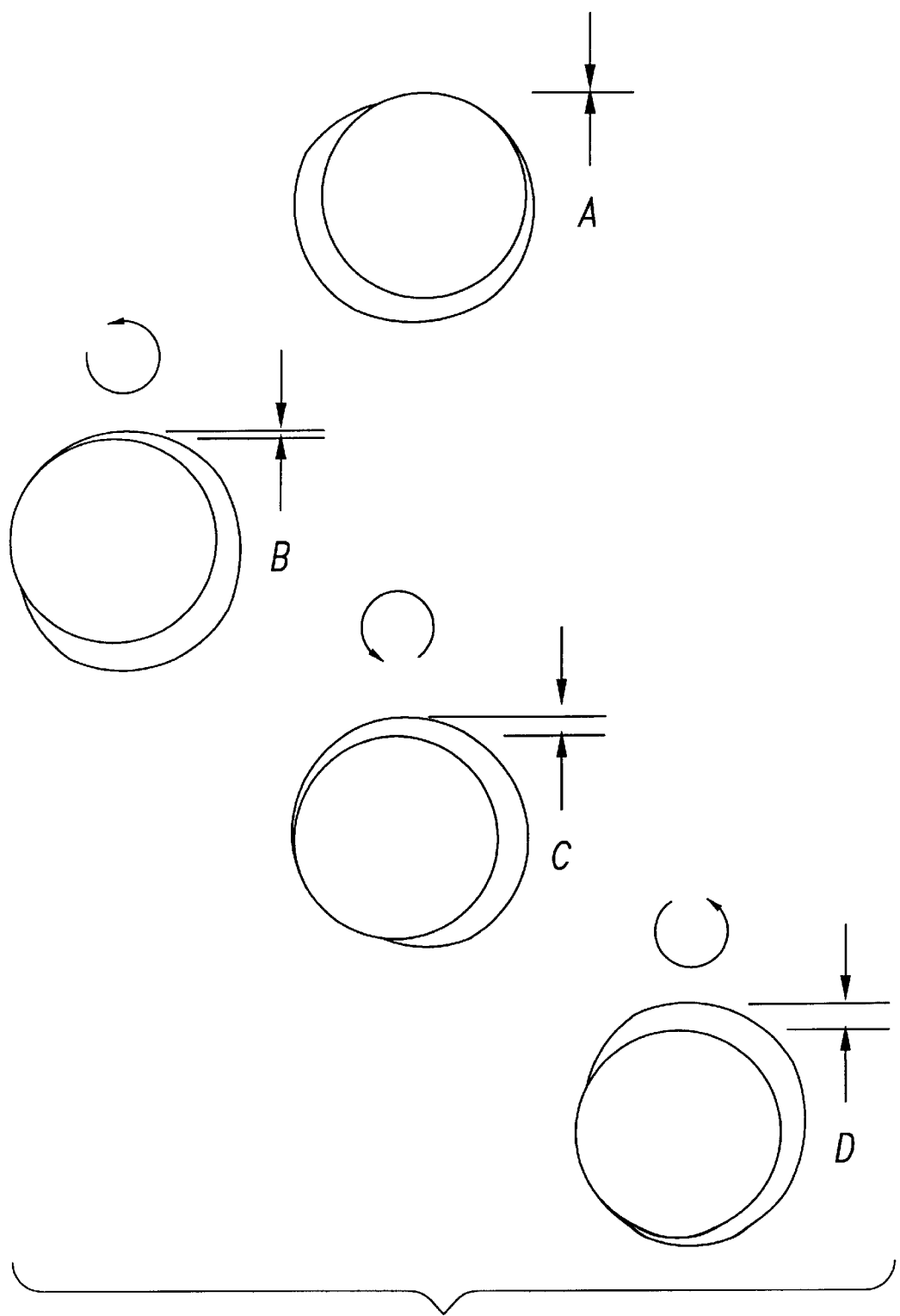
FIG. 8 A–D are end elevational views of a cam lobe having a 270 degree ramp.
Figure 9:
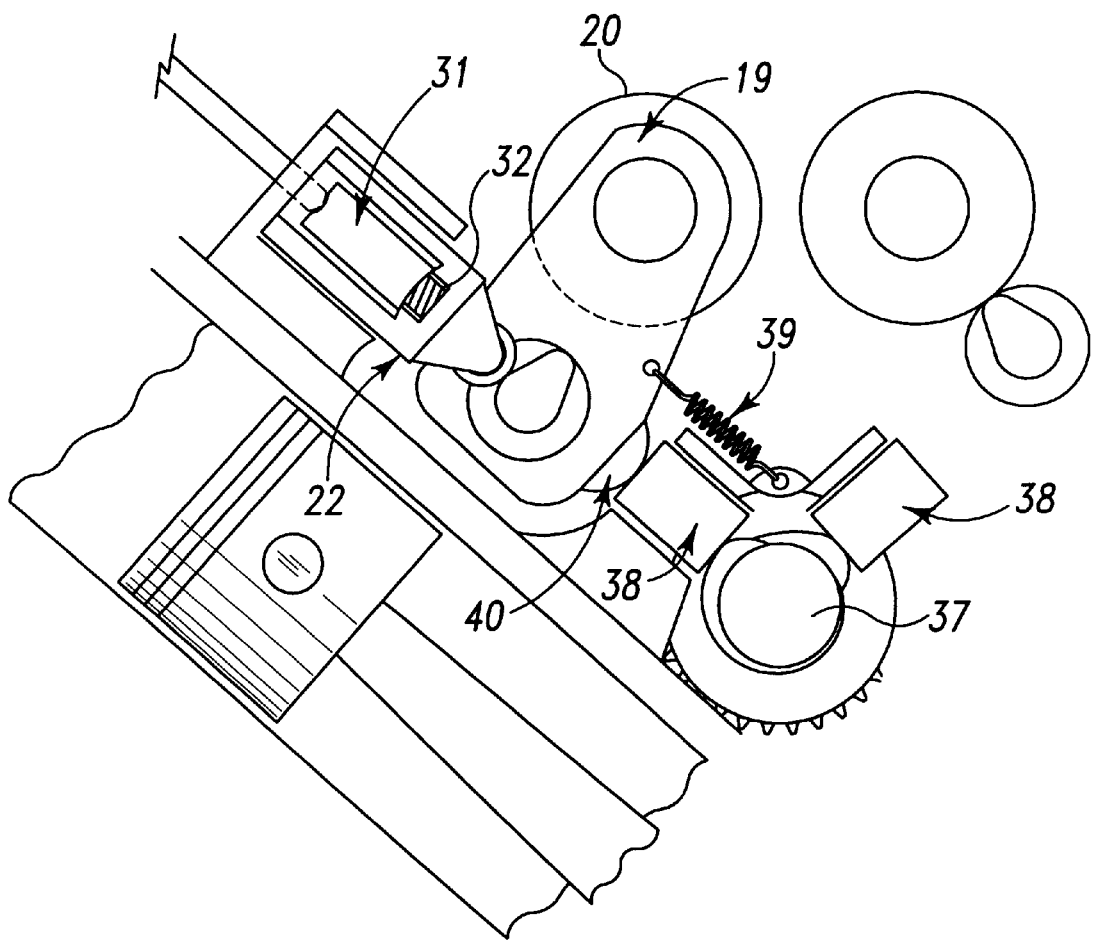
FIG. 9 is a partial cross sectional front view of an engine incorporating a second embodiment of the present invention.
Figure 11:
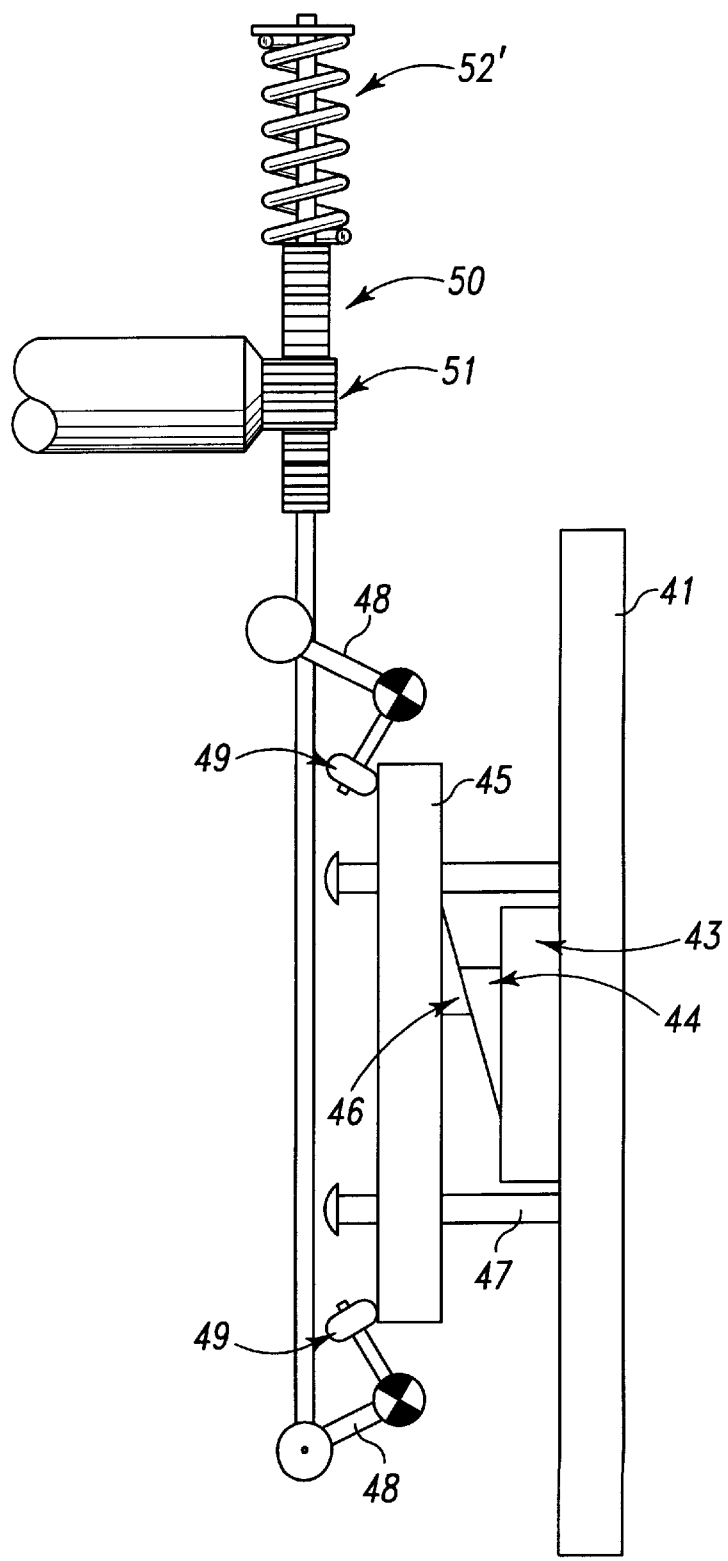
FIG. 11 is a side view of the flywheel of FIG. 10 coupled to a rotor and ramp shaft of the second embodiment of FIG. 9.

FIG. 8 shows the end of a shaft with a 270 degree ramp around the outer perimeter of the shaft. The rotation of the shaft changes the radius distance from the center of the shaft to the outer surface as shown in FIG. 8 parts A, B, C and D. FIG. 9 shows that the end of ramp shaft 37 and is located in the existing camshaft bore in the valley of the V-8 block. Ramps on this common shaft are positioned to align with the existing lifter pockets serving each bank of cylinders. A bracket piston 38, which is similar to a solid lifter for a conventional camshaft, is installed in the existing lifter pocket. The ramp shaft 37 has five bearing surfaces which align with the bearings that are normally pressed into the V-8 block for use with a conventional camshaft. The ramp shaft is made with two (2) series of ramps, 90 degrees out of phase with each other and alternate along the length of the ramp shaft. Each set of ramps is intended, therefore, to operate upon one set of suspension brackets which are located on each side of the camshaft valley.

FIG. 9 shows that the ramp shaft 37 contacts the bracket piston 38. A set of return springs 39 is used to assure that consistent pressure is exerted on the suspension brackets, bracket pistons and ramp shaft. The bracket pistons are located in the existing sixteen (16) lifter pockets. Because the existing lifter pockets are offset to match the location of the lobes of a conventional camshaft, the existing lifter pockets may not align exactly with the suspension brackets. A tie bar 40 (end view) is used to connect the suspension brackets 18 and 19 together and thereby bridge the openings of the existing lifter pockets. Responding to the force from the rotation of the ramp shaft, the bracket pistons 38 in turn exert pressure across the tie bar which will moves the suspension brackets and the camshaft toward the lifter assemblies 22. FIG. 9 shows that the full height of the ramp has compressed the lifter assembly spring 32. As the ramp shaft is rotated clockwise, the cam ramp is decreased and the springs within the lifter assemblies, and the return springs 39, will pull the suspension brackets away from the lifter assemblies.

FIG. 10-A and 10-B shows the inside face of the flywheel 41 which is fitted with six centrifugal weights 42. These weights have gear teeth which engage a center ring gear 43. As the speed of the flywheel increases the movement of the weights serves to rotate the center ring gear. Return springs, not shown, can be located in a number of ways to counteract the centrifugal force exerted on the weights as flywheel speed increases. FIG. 10-C shows a side view of the ring gear which is made with a series of inclines 44.

Figure 12:
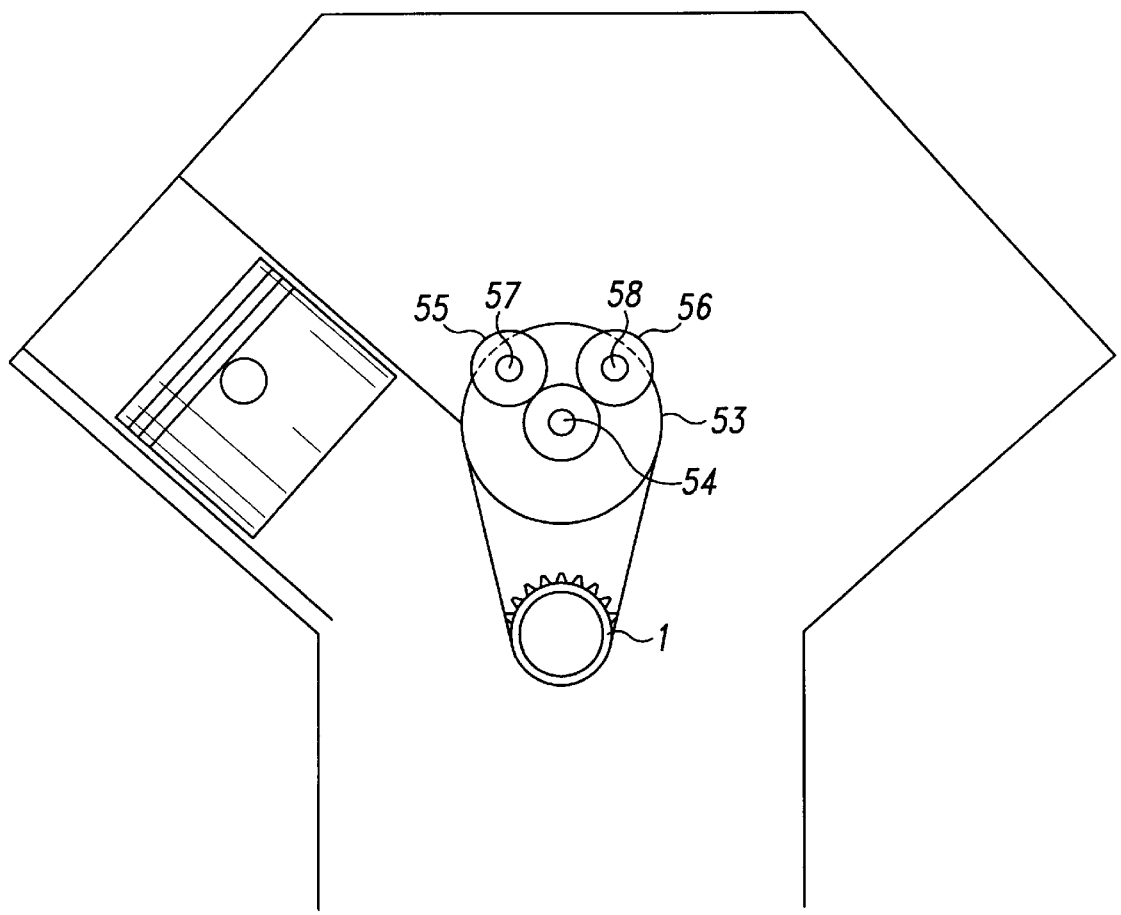
FIG. 12 is a front elevational view of an engine incorporating a third embodiment of the present invention.

FIG. 12 shows that a rotor 45 with corresponding inclines 46 is positioned on the flywheel and is held in the same rotational position as the flywheel by the use of six posts 47. The rotation of the ring gear forces the rotor away from the flywheel. The outer edge of the rotor contacts two (or more) rocker arms 48 which rotate on mounting shafts secured to the engine block. The rocker arms 48 are fitted with rollers or wheels 49. The rollers ride on the outer edge of the rotor. With an increase in engine speed the inward force of the rotor exerts pressure on the rollers and their rocker arms which drive two gear racks 50. These gear racks in turn engage the opposite sides of a pinion gear 51 located on the end of the ramp shaft.

With a reduction in engine speed, the centrifugal force on the flywheel weights is decreased and the center ring gear with its inclined surfaces are no longer forcing the rotor away from the flywheel. The compression springs 52 on the end of the gear racks serve to return the ramp shaft to its idle position and cause the rocker arms to force the rotor back against the flywheel as the speed (r.p.m.) of the engine is decreasing.

An electromechanical system, by which the ramp shaft is connected to a reduction gear set and a stepper motor (not shown) is an alternative method of rotating the ramp shaft. Changes in engine speed can be monitored by optical or magnetic sensors. This information can be feed to an electronic control circuit and appropriate inputs to the stepper motor will cause rotation of the gear reduction set and eventually the ramp shaft. Although there may be a significant reliability advantage with a purely mechanical system, the electro-mechanical system can be expected to provide a greater degree of control and can be designed to accept other inputs, i.e.; manifold pressure, to optimize cam positioning under a variety of load conditions and engine speeds.

THETA DESIGN

The Alpha design provides the variable lift and a dynamic change in reducing the duration for both intake and exhaust valves. The motion of the camshaft away from the lifter assembly must, however, advance or retard the timing for both the exhaust and the intake valves. It would be desirable to control the lift and duration of intake valves independent of the exhaust valves, and thereby use the advance or retarding of valve timing to maximize efficiency of the submitted invention.

For a given engine design, the measurements of horsepower, torque and fuel consumption will establish optimum lift distances of the intake and exhaust valves over a range of pre-determined engine speeds. It is expected that optimum exhaust valve lift distances will be different than the set of optimum values of the intake valve over the same range of engine speeds. As will be discussed in following paragraphs, the advancement or retardation of the valve opening envelope, as the cam traverses its limited arc around the drive gear, can be utilized to complement the decrease in duration of valve opening. Therefore independent operation and control of camshafts, that is the varying of lift and duration of dedicated intake and exhaust camshafts, should promote added engine efficiency and performance.

The Theta design is a method of driving four cams, two intake and two exhaust, around two center drive gears and support shafts.

FIG. 12 shows the Theta design as viewed from the front of the V-8 block. The crankshaft drives a timing gear 53 that provides the standard two-to-one reduction. Behind the timing gear is a drive gear 54 that engages two "Y" gears 55 and 56 which in turn drives two "Y" shafts 57 and 58 which extend through the valley of the V-8 block. Both "Y" shafts turn in the same direction. One of the "Y" shafts drives both exhaust valve camshafts. The other "Y" shaft drives both intake valve camshafts.

Figure 13:
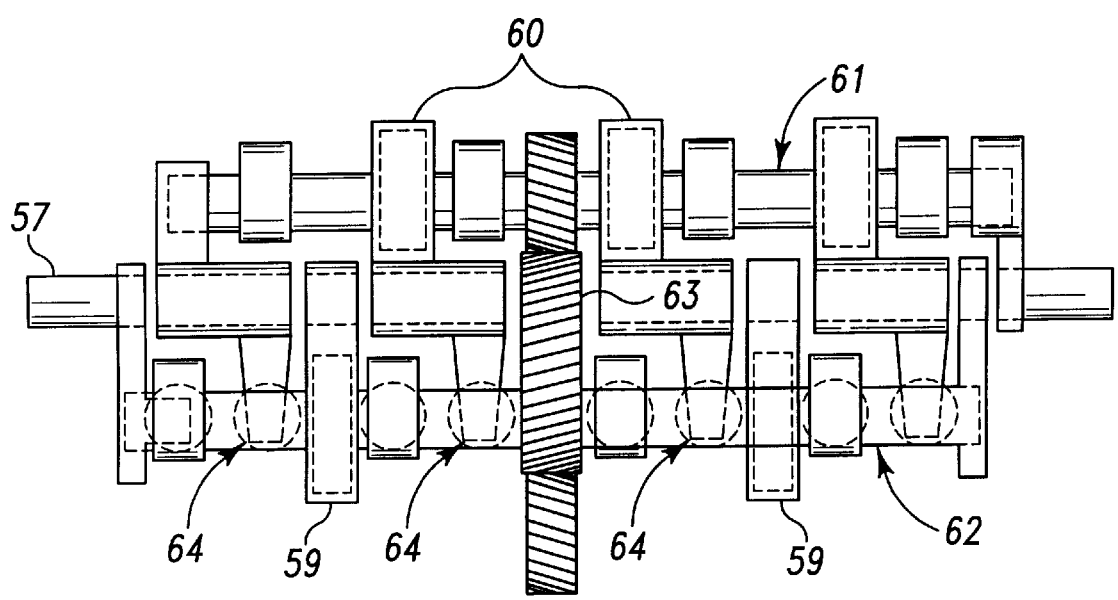
FIG. 13 is a side elevational view of a "Y"-shaft and camshaft arrangement utilized in the third embodiment of the present invention.
Figure 14:
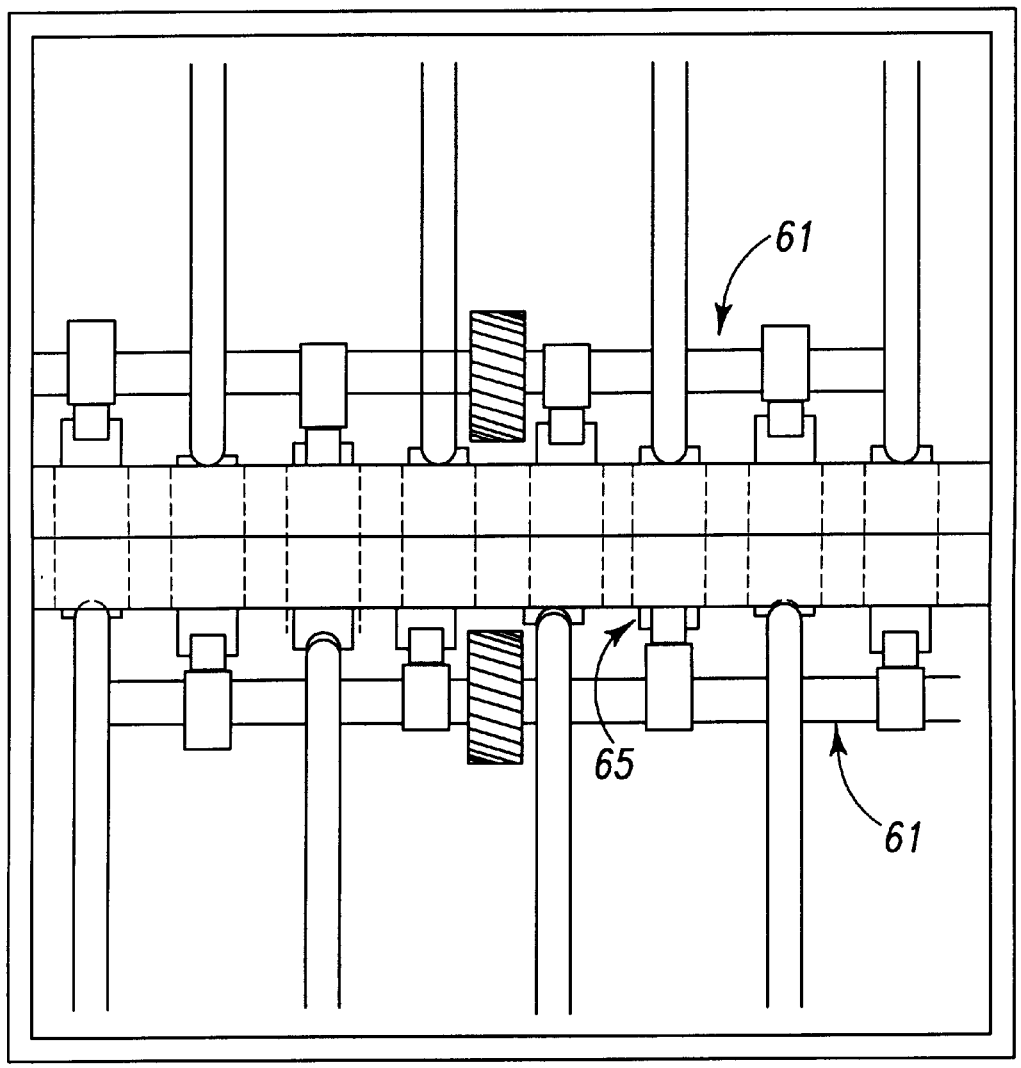
FIG. 14 is a top plan view of a pair of camshafts utilized in the third embodiment of the present invention.

FIG. 13 shows a side view of one "Y" shafts 57 and the associated suspension brackets 59 and rocker brackets 60 which supports two (2) camshafts 61 and 62. Each camshaft is driven by the center drive gear 63 located at midway on the "Y" shaft. The rocker brackets 57 which hold and position the upper camshaft, is activated by the lower arms of these brackets engaging ramp pistons due to their position over the lifter pockets 64. The lower suspension brackets 59 are directly contacted by the ramp pistons (conventional solid lifters) within the engine block's existing lifter pockets. FIG. 14 shows a top view of the alternating position of the lifter assemblies along the inside of the V-8 valley. From this perspective only the upper camshafts are shown in position with their respective lifter assembly and push rod.

Figure 15:
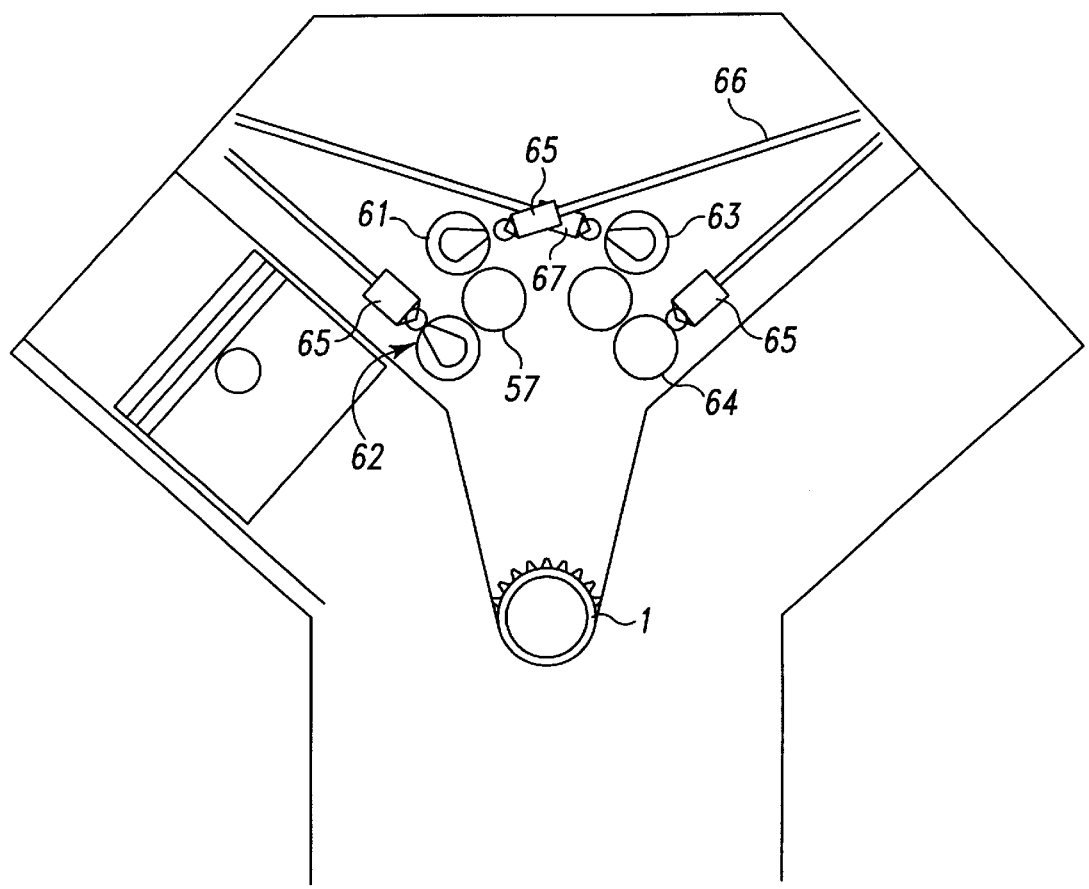
FIG. 15 is a first partial cross sectional front view of the third embodiment of the present invention.

FIG. 15 shows the position of the upper exhaust camshafts 61 and lower exhaust camshaft 62 and their engagement to "Y" shafts 57 and 58, and suspension brackets from an end view. The right side of FIG. 15 shows upper intake camshaft 63 and lower camshaft 64.

Lifter assemblies 65 are located along each of the bottom camshafts in a manner similar to the Alpha Design. FIG. 15 shows lifter assemblies 65 that engage the upper exhaust camshafts 61 and drive push rods 66 toward the opposite bank of cylinder heads. FIG. 15 also shows that the upper intake camshaft 63 engages another set of lifter assemblies 67 that operates the intake valves on the left side of the block.

Figure 16:
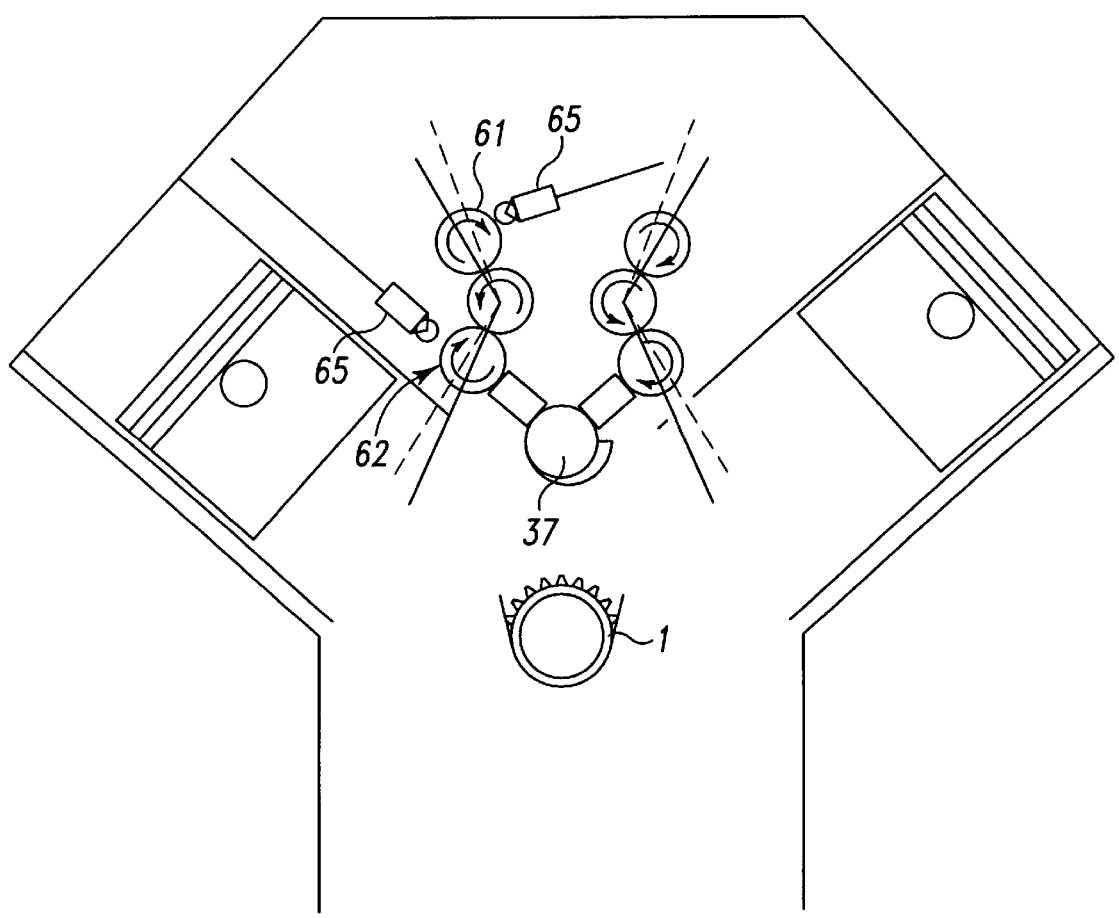
FIG. 16 is a second partial cross sectional front view of the third embodiment of the present invention.

Referring to FIG. 16, as engine speed is increased, the ramp shaft 37 is rotated through use of a mechanical system previously described in the Omega Design. As shown the left "Y" shaft and its associated camshafts 61 and 62 are engaged to operate the engine's exhaust valves. The rotation of the ramp shaft 37 causes both the upper and lower exhaust camshafts, housed in the suspension brackets and the rocker brackets shown in FIG. 13, to be advanced in valve timing as the upper and lower camshaft are positioned closer to their correspondent bank of lifter assemblies. As will be explained in greater detail, FIG. 18 shows the advancement of the valve timing envelope and the movement of the maximum lift point of PE3 for idle speed through PE2 to PE1 for maximum speed. Referring back to FIG. 17, with an increase in engine speed the ramp shaft will also exert pressure on the suspension brackets and rocker brackets that house and support both intake camshafts on the right side of the drawing. With the movement of the suspension brackets the intake camshafts also change their angular position around the center drive gear of the right "Y" shaft as the camshafts are moved closer to their respective bank of lifter assemblies. This angular position change, with an increase in engine speed, serves to retard the overall envelope of intake valve timing.

DELTA DESIGN

The previous designs anticipate the use of over head valve cylinder heads with little or no modification to the heads or existing cylinder head components. Designs for engines that will produce very high r.p.m. engine speeds, however, usually employ overhead camshafts. The advantages of overhead camshaft designs are found in the elimination or reduction of valve train components in a rocker arm/push rod system. These components, substantial in number, are each a source of potential failure at high r.p.m. levels of engine speed. Failure of these components at high engine speed can often be traced to the extreme forces that are required to overcome the inertia, friction and spring compression resistance present in this reciprocating system of links to the camshaft.

Overhead camshaft designs reduce the number of moving parts in the valve train. This simplicity of valve train operation does, however, require additional complexity in camshaft drive components. The drawback to overhead camshafts is therefore the cost and reliability of the method of transmitting a camshaft driving force from the crankshaft to the cylinder head.

Figure 17:
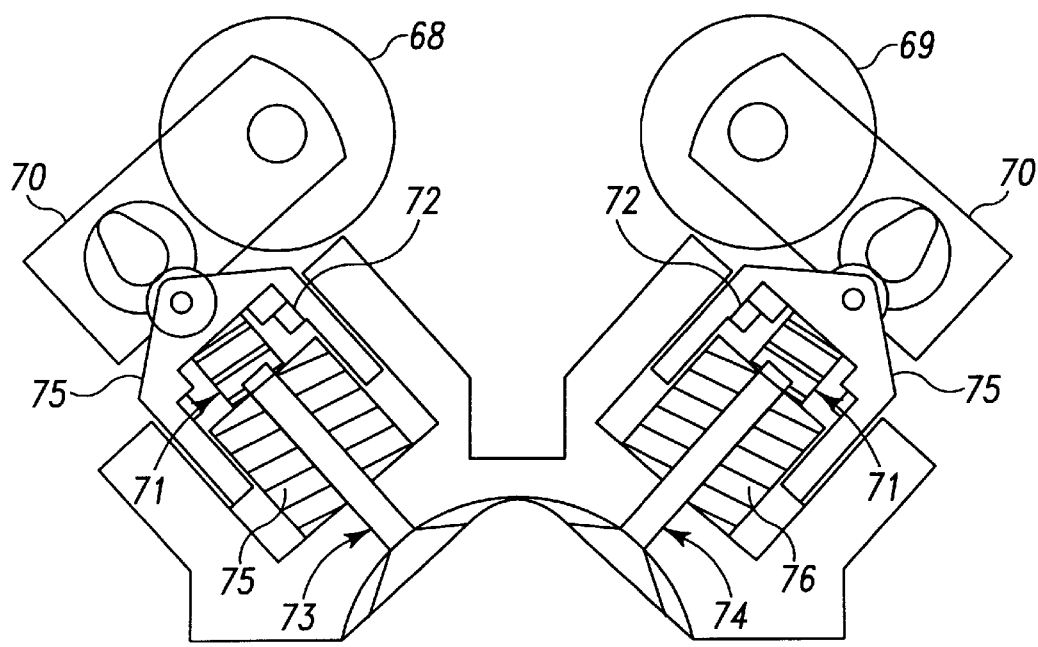
FIG. 17 is a partial cross sectional view of an engine incorporating a fourth embodiment of the present invention.
Figure 18A:
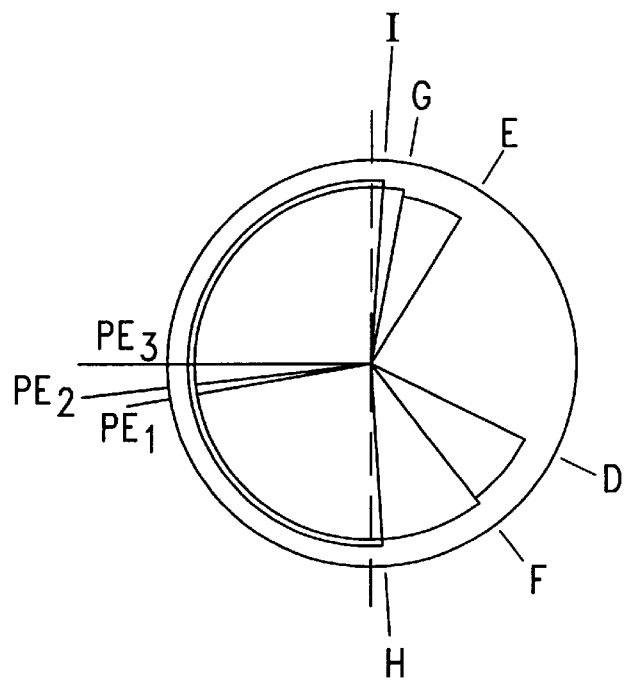
FIG. 18 is a schematic diagram illustrating valve timing of the present invention.
Figure 18B:
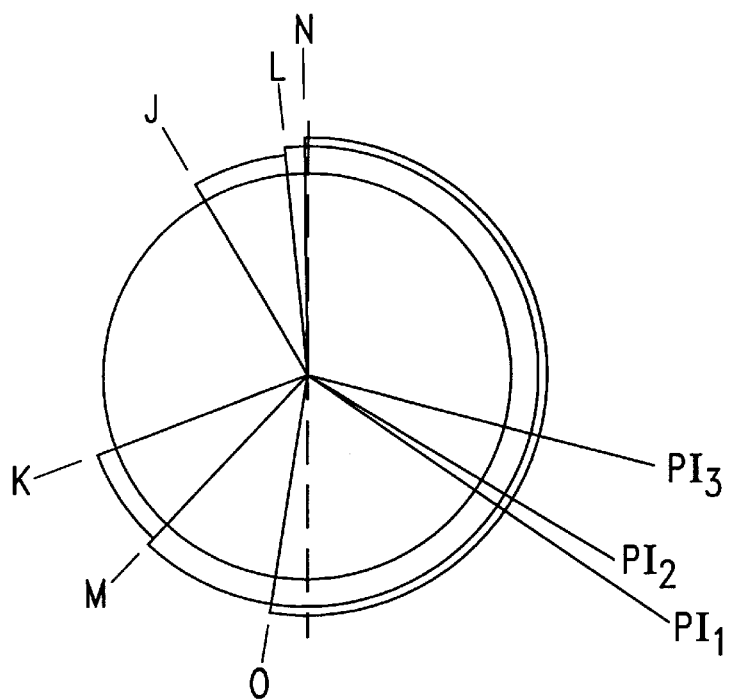

FIG. 17 shows the employment of the V.L.C. as an over-head camshaft. As with the Theta design, dedicated intake and exhaust camshafts are utilized and they are completely independent in their operation toward or away from the lifter/valve assemblies. Through any number of gear arrangements, the drive gears 68 and 69 can be operated at one-forth (¼) the crankshaft speed. In a system similar to the Theta Design the overhead camshafts may also be driven by a one to one gear arrangement and the drive gear would then be rotated at the standard one-half (½) crankshaft speed.

Suspension brackets 70 are attached to the drive shaft, allowing the camshaft to rotate in arc relative to the drive gears 68 and 69. Cam levers, similar to previous designs, could be employed to move the suspension brackets and the camshaft toward or away from the lifter body assemblies. Alternatively, the Omega Design, with the ramp shaft and ramp lifters, can be used with push rods (not shown) that exert force on the suspension brackets. With rotation of each camshaft, the distance each camshaft is positioned away from the valve is first absorbed by coil spring 71. Lifter stops 72 may be installed to precisely adjust the point at which the camshaft begins to initiate valve opening. FIG. 17 also shows that the exhaust valve 73 and the intake valve 74 are engaged with the usual compression springs 75 and 76.

The Delta design shown pre-supposes that a specialized and unique cylinder head is cast with the necessary mounts and fixtures to accommodate suspension brackets, drive gears, lifter assemblies 75, and the other hardware necessary for this design. It is also anticipated that some existing cylinder heads, intended for push rod/rocker arm operation, could be utilized with a variable lift camshaft design that would replace the existing rocker arms and/or mount to existing rocker arm studs.

Referring to FIG. 5 and 6 showing the Alpha Design, the submitted invention allows the camshafts 17, with their suspension brackets 18 & 19, to traverse a relatively short arc around the drive gear 20. Because the drive gear is twice the diameter of the cam gear 18, an arc of rotation of the cam gear around the drive gear of as much as ten (10) degrees is essentially a linear motion. This linear motion can be utilized to position the camshaft to operate at various points which fully or partially utilizes the offset of the cam lobes.

For high speed engine operation, the camshaft lobes are in full contact with their respective lifter set and the previously described cam profile of high lift and long duration is fully utilized. When the camshaft is moved away from the lifter set, as engine speed is reduced, the point of crankshaft rotation at which the valve will begin opening or complete closing is also affected. At idle speed the actual lift on the valve can be set to be less than one-half (½) the lift at full r.p.m.

In this manner a camshaft can be designed to effect a large valve opening (lift and duration) at high r.p.m.'s. and thereby promote the maximum volume of airflow though the combustion chamber which will in turn increase horsepower and torque. Moreover, the camshaft with a long duration of valve lift therefore sets the opening and closing points of the intake and exhaust valves to yield a high degree of valve overlap at top dead center of the exhaust stroke. At high engine speeds an early exhaust valve opening point, as well as a delayed intake valve closing point, aids in improving volumetric efficiency.

Idle speed for a Variable Lift Camshaft (V.L.C.) engine can also be lower than a conventional engine with the same cam lobe profile. Using an identical cam lobe profile in low r.p.m. operation, the cam lobe must first "make up" the distance between the inner and outer lifter before the valve is moved off its seat. The actual valve lift will be decreased proportionally to the distance the cam lobe has been moved away from the lifter assembly.

As the cam lobe is moved away from the lifter the duration of valve opening will also be reduced. This method can be used to reduce the amount of valve overlap at idle speeds or low r.p.m. throttle settings.

There are number of possible methods of moving the suspension brackets which house and support the rotating camshafts. The Omega design provides a method which utilizes existing structures in the conventional V-8 block and reduces the number of modifications and additional hardware that would be required in the Alpha design. The use of the ramp shaft provides a gradual rise over 270 degrees of rotation. This allows a more exact positioning of the suspension brackets and camshaft when compared to the approximate 90 degrees of rotation for the cam lever which is shown in the Alpha Design. To uniformly position the cam lobes equidistant from the lifter assemblies, the Alpha design would also require the fabrication of mounting blocks 28 on the interior surface of the camshaft valley. The fabrication and installation of mounting blocks would require very precise measurements to insure that the cam levers are symmetrical with respect to the opposite side of the block and equidistant from each side of the lifter assembly block.

In the Alpha design, valve spring forces and vibration are transmitted to the cam lever mounting blocks. In the Omega design, the valve spring forces and vibration are transmitted through the bracket pistons to the ramp shaft which receives an opposing force from the opposite bank of valves. Moreover, the ramp shaft is securely located in the middle of the engine block and is supported by existing engine block webs and bearings surfaces.

The Omega design, as a method of positioning the suspension brackets, offers other substantial advantages to the cam lever arrangement as shown in the Alpha design. The use of the ramp shaft and the existing lifter pockets results in fewer fabricated parts and fewer modifications for support structures on the existing V-8 cylinder block. Moreover, the ramp shaft with its 270 degrees of rotation, is better suited to provide a uniform change of suspension bracket positioning when compared to the cam lever. The cam lever method utilizes less than 90 degrees of rotation to move the suspension brackets the same distance.

The rotation of the camshaft around the driving gear also affects the valve timing. For the Theta and Delta designs that utilize designated cams for exhaust and intake, this positional change can be used to additional advantage. A camshaft movement of only five (5) degrees of arc around the drive gear can be utilized to retard the exhaust valve opening envelope period as engine speed decreases. Correspondingly, the motion of an intake valve camshaft can be designed so that the camshaft movement will advance the intake valve opening envelope as engine speed decreases.

Figure 2:
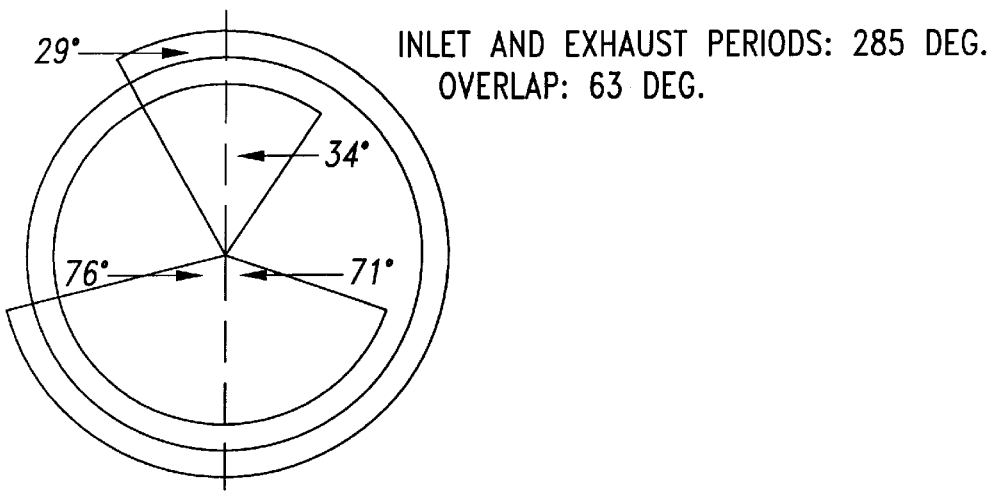
FIG. 2 is a schematic diagram illustrating valve timing with extended overlap and opening periods.
Figure 2:
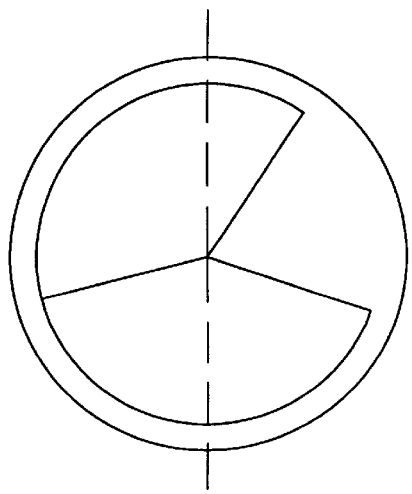
Figure 2:
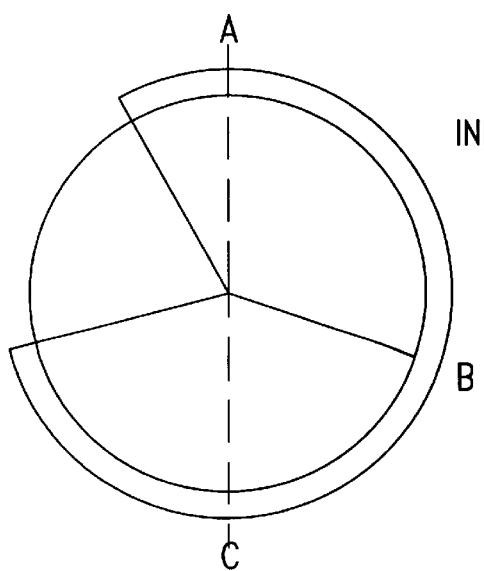

A review of Smith's diagrams, FIGS. 1 and 2, shows why this advancement or retarding of gear timing is important. At top dead center, the amount of optimum change exhaust valve closing and intake valve opening in terms of crankshaft rotation, is less than the optimum amount of change of exhaust valve opening and intake valve closing. In other words, the shifting of point "B" in FIGS. 1 and 2 is also desirable along with a reduction in the valve opening envelope. For the intake valve, at lower engine speeds, it is desirable to reduce the overall envelope and advance point "B" with respect to crankshaft rotation on the intake stroke. For the exhaust stroke, at low engine speeds, it is desired to reduce the valve opening envelope and retard point "B" on the exhaust stroke. With consideration of the direction of movement of the camshaft and the rotation direction of the drive gear, the movement of the cam will then shift the maximum valve lift point in the desired direction.

Because volumetric efficiency for a specific r.p.m. depends on an optimum valve operation sequence, an engine with a variable lift camshaft can be operated over a range of engine speed and still achieve higher overall efficiency. The operation of dedicated exhaust and intake camshafts will allow additional control over valve lift and duration, and the advancement or retarding of the duration envelope for a specific engine speed. Due to the fact that the engine consumes fuel while idling, without sacrificing high engine speed performance of a given displacement engine will, in principle, reduce emissions and save fuel.

During idle operation in a conventional engine, make-up fuel is added to the fuel stream which insures that the desired 14 to 1 air to fuel mixture is achieved to maintain repeated and reliable combustion. With the use of the submitted invention, the reduced valve lift serves to create more turbulence in the incoming fuel/air stream and thereby promotes fuel droplet suspension in this air stream. As a result fuel once needed to insure a rich mixture is saved and overall exhaust emissions are reduced.

A system of valve timing, that opens and closes the valves at or near optimum points for low speed operation, will also serve to allow the engine to operate at a lower idle speed and decrease the vibration and rough idle conditions usually associated with a reduction of idle speed. Optimum valve timing for idle conditions will generally be found in:

1. Opening the Exhaust Valve at or near bottom dead center of the power stroke,
2. Closing the Exhaust valve at or near top dead center of the exhaust stroke,
3. Opening the intake valve at the point the exhaust valve closes (minimize valve overlap),
4. Closing the intake valve shortly after the piston reaches bottom dead center on the intake stroke.

Under these conditions the pressure generated in the power stroke will be fully utilized and there will still be adequate time during the exhaust stroke to eliminate the spent combustion gases. Little or no valve overlap will reduce the possibility of engine backfires through the intake manifold. A reduction of the force necessary to open the valves to their full lift potential will serve to reduce the internal friction and back pressure on the engine at idle speed. It is anticipated that the normal idle speed of a typical automotive engine with a fixed cam lobe and fixed valve lift could be reduced by as much as fifty percent (50%). Considering the amount of fuel consumed at idle speed by an auto engine over its useful life in a variety of road conditions, the operational economy of the vehicle would be measurably enhanced.

The Theta design and the Delta design use independent dedicated intake and exhaust camshafts. An analysis of the Theta design will also serve to show the preferred embodiments for the Delta design. Referring again to FIG. 16, the dotted lines shows the position of the camshafts at high speed operation with the cam lobes positioned toward the lifter assemblies. The solid lines, and the position of the cam axis on the solid lines, shows the position of the camshafts during low speed operation. With the linear movement of the camshaft axis toward and away from the lifter assemblies is a corresponding angular displacement with the rotation of the camshafts around the two drive shafts and drive gears. As the speed of the engine increases, the ramp shaft 37 is rotated and the centers of the camshafts move from their position along the solid line toward the position long the segmented line.

For the two exhaust camshafts operating on the left "Y" shaft, this motion of the camshafts toward lifter assemblies, from the increase in engine speed, will advance the overall envelope of exhaust valve opening. Conversely, for the two camshafts operating off of the right "Y" shaft, the motion of the intake camshafts toward the lifter assemblies, with an increase in engine speed, will retard the point of peak valve opening.

Referring to FIG. 18 shows that the diagrams from FIGS. 1 and 2 have been overlaid on each other. The top diagram of FIG. 2 shows the opening and closing points for the exhaust valve using a high performance camshaft lobe. In FIG. 18 the exhaust valve opening period clock wise from "D" to "E" is identical to the top diagram of FIG. 2. In FIG. 2 the peak valve opening point is identified as "B". This same point, 68 degrees past bottom dead center is represented as PE1 (peak exhaust 1) in FIG. 18.

In FIG. 18-A the exhaust opening and closing points for a moderate grind camshaft lobe is represented as the pie shaped segment clockwise from "F" to "G". This segment is identical to the exhaust diagram of FIG. 1. The point "B" (maximum lift) in FIG. 1 is represented as PE2 in FIG. 18-A. A third pie segment in FIG. 18-A exhaust diagram is "H" to "I" and represents a nearly ideal valve opening envelope for very low speed operation. The peak lift point for this segment is represented as PE3.

In a similar manner the intake diagrams of FIGS. 1 and 2 are superimposed on each other to make the intake diagram of FIG. 18-B. Segment "J" to "K" is identical to the high performance intake diagram of FIG. 2. Segment "L" to "M" is identical to the moderate performance camshaft of FIG. 1. Segment "N" to "O" represents a idealized opening and closing points for low speed operation. The peak opening points for the three intake duration envelopes are represented as PI1, PI2 and PI3.

It can now be seen that as engine speed decreases, the desired maximum lift point of the exhaust valve shifts from PE1 through PE2 to PE3. This shift, from full speed to idle speed, is a retarding of the midpoint position (peak lift) in the exhaust valve opening envelope. In a like manner the midpoint position (peak lift) of the intake valve also shifts as engine speed decreases from PI1 through PI2 to PI3. This shift is, however, an advancement in intake valve timing.

The Theta design uses the angular displacement of the shaft of dedicated intake or exhaust lobe camshaft to complement the overall reduction of the duration envelope. As the camshaft is moved away from the lifter assembly and there is a reduction in the lift and duration of valve opening, the movement of the camshaft will, depending on the rotation of the drive gear, be either a retarding or advancing of the timing of the point of peak valve opening.

The amount of duration shift of the valve opening envelope will increase as a function of the reduction of the sum of the radius of the drive gear and the radius of the cam gear. Assume that the maximum distance of movement of the cam with respect to the inner lifter is three-eighths of an inch (⅜"). The reduction of the sum of the two radii will cause the ⅜" displacement to be a larger angular displacement of the cam around the drive gear. Therefore, the use of a one-to-one drive combination of the drive gear and the cam gear in this design, will further reduce the sum of the two radii and increase the amount of angular displacement that is available to shift the peak opening point of the reduced duration envelope of valve opening. The limit of this process is found when the arc motion of the camshaft around the drive gear is so non-linear that the operation is detrimental to the smooth operation of the cam lobe against the lifter assembly.

The following equations provides a summary of the effect of the angular displacement of the rotating camshaft around the drive gear and is a method of determining the opening and closing points of the exhaust and intake valves. The change in angular displacement of the camshaft around the drive gear will either advance or retard the point of peak valve lift and will shift the valve opening envelope as the engine r.p.m. is reduced from full speed to idle.

Where:

I op min=The opening point of the intake valve at minimum speed (degrees of crank rotation), I cl min=The closing point of the intake valve at minimum speed, I op max=The opening point of the intake valve at maximum speed, I cl max=The closing point of the intake valve at maximum speed, E op min=The opening point of the exhaust valve at minimum speed, E cl min=The closing point of the exhaust valve at minimum speed, E op max=The opening point of the exhaust valve at maximum speed, E cl max=The closing point of the exhaust valve at maximum speed, Δ DR=Change in Duration Reduction; the amount of decrease in duration due to the movement of the cam away from the lifter, Δ AD=Change in Angular Displacement; the amount of shift, advancement or retarding of cam timing, due the motion of the cam around the drive gear.

Therefore, to determine the opening and closing points of the intake valves at idle speed:

I op min=I op max−Δ DR+2Δ AD, and

I cl min=I cl max−Δ DR−2Δ AD.

For the exhaust valves the opening and closing points would be found by:

E op min=E op max−Δ DR−2Δ AD, and

E cl min=E cl max−Δ DR+2Δ AD.

It can be seen, therefore, that the shift in angular position of the camshaft around the drive gear can be used in dedicated intake and exhaust camshafts to shift the valve opening envelope and thereby approach the idealized envelopes as shown in FIG. 18. The submitted invention serves to increase volumetric efficiency by automatically adjusting the valve lift to correspond to the flow requirements of the engine over a range of engine operation. As the lift on the valves is reduced there is a corresponding reduction in the duration of the valve opening envelope. Additionally, the submitted invention provides a method of shifting the peak opening point of the exhaust and intake valves. This shift in the peak opening point aids in matching the reduced duration envelope of valve opening to approximately match an idealized valve opening envelope for a specific engine speed.

What is claimed:

1. A method for variable valve lift in an internal combustion engine, comprising the steps of:
   a). providing at least one camshaft operatively engaging at least one valve train of the engine for effecting opening and closing of at least one intake valve and at least one exhaust valve;
   b). sensing an engine speed of the engine; and,
   c). adjusting a distance between an axis of the at least one camshaft and the at least one valve train as a function of the sensed engine speed, wherein opening of the intake valve is advanced with an increase in engine speed and opening of the exhaust valve is retarded with the increase in engine speed, and wherein a point of maximum lift of the intake valve is retarded with the increase in the engine speed and a point of maximum lift of the exhaust valve is advanced with the increase in engine speed.

2. The method of claim 1, wherein the camshaft has a quiescent axial position resulting in minimum lift of the at least one valve.

3. A variable valve lift and timing camshaft support mechanism for internal combustion engines, comprising; at least one valve train;

at least one camshaft operatively engaging the at least one valve train for effecting opening and closing of at least one intake valve and at least one exhaust valve; and, a bracket supporting the camshaft and positioning an axis of the camshaft; and, a structure engaging the bracket, such that movement of the structure changes a distance between the camshaft axis and the at least one valve train, wherein opening of the intake valve is advanced with an increase in engine speed and opening of the exhaust valve is retarded with the increase in engine speed, and wherein a point of maximum lift of the intake valve is retarded with the increase in the engine speed and a point of maximum lift of the exhaust valve is advanced with the increase in engine speed.

4. The mechanism of claim 3, wherein the structure is a lever.

5. The mechanism of claim 4, further comprising: at least one piston coupled to the lever, such that actuation of the at least one piston causes movement of the lever.

6. The mechanism of claim 4, wherein the lever is coupled to the engine by a pivot post offset from a center of an end of the lever.

7. The mechanism of claim 3, wherein the structure comprises a ramp shaft having at least one ramp thereon operative to move the bracket varying distances depending upon a rotational position of the ramp shaft.

8. The mechanism of claim 7 further comprising: at least one lifter positioned between the ramp shaft and the bracket.

9. The mechanism of claim 7, further comprising:

a flywheel comprising:

a center ring gear; and, a plurality of centrifugal weights coupled to the center ring gear and operable to rotate the center ring gear in response to a speed change of the engine;

wherein the center ring gear is operatively coupled to the ramp shaft, such that rotation of the center ring gear causes rotation of the ramp shaft.

10. The mechanism of claim 3, wherein the camshaft effects opening and closing of only intake valves.

11. The mechanism of claim 3, wherein the camshaft effects opening and closing of only exhaust valves.

* * * * *